United States Patent
Ohgose et al.

(10) Patent No.: US 8,594,185 B2
(45) Date of Patent: Nov. 26, 2013

(54) IMAGE CODING APPARATUS AND IMAGE CODING METHOD

(75) Inventors: Hideyuki Ohgose, Osaka (JP); Hiroshi Arakawa, Nara (JP)

(73) Assignee: Panasonic Corporation, Osaka (JP)

( * ) Notice: Subject to any disclaimer, the term of this patent is extended or adjusted under 35 U.S.C. 154(b) by 970 days.

(21) Appl. No.: 12/697,397

(22) Filed: Feb. 1, 2010

(65) Prior Publication Data

US 2010/0208794 A1    Aug. 19, 2010

(30) Foreign Application Priority Data

Feb. 2, 2009 (JP) ................................. 2009-022020

(51) Int. Cl.
*H04N 11/02* (2006.01)

(52) U.S. Cl.
USPC ............. 375/240.02; 375/240.12; 375/240.24

(58) Field of Classification Search
None
See application file for complete search history.

(56) References Cited

U.S. PATENT DOCUMENTS

| | | | |
|---|---|---|---|
| 6,795,503 B2 | 9/2004 | Nakao et al. | |
| 6,836,513 B2 | 12/2004 | Hayashita et al. | |
| 7,848,424 B2 * | 12/2010 | Bock et al. | 375/240.15 |
| 8,102,911 B2 | 1/2012 | Arakawa et al. | |
| 8,345,744 B2 * | 1/2013 | Kitamura | 375/240.02 |
| 2002/0044605 A1 | 4/2002 | Nakamura | |
| 2004/0240558 A1 | 12/2004 | Hatano et al. | |
| 2005/0249289 A1 * | 11/2005 | Yagasaki et al. | 375/240.18 |
| 2007/0133892 A1 * | 6/2007 | Chiba et al. | 382/239 |
| 2007/0280353 A1 * | 12/2007 | Arakawa et al. | 375/240.12 |
| 2007/0286280 A1 | 12/2007 | Saigo et al. | |
| 2009/0190655 A1 | 7/2009 | Shimada et al. | |

FOREIGN PATENT DOCUMENTS

| | | |
|---|---|---|
| JP | 2000-333180 | 11/2000 |
| JP | 2004-135251 | 4/2004 |
| JP | 2007-329551 | 12/2007 |
| JP | 2007-329827 | 12/2007 |
| WO | 2008/041300 A1 | 4/2008 |
| WO | 2008/041300 | 1/2010 |

OTHER PUBLICATIONS

"Advanced video coding for generic audiovisual services", ITU-T Recommendation H.264, ISO/IEC 14496-10: 2005, Mar. 2005.

* cited by examiner

*Primary Examiner* — Christopher S Kelley
*Assistant Examiner* — Christopher Findley
(74) *Attorney, Agent, or Firm* — Wenderoth, Lind & Ponack, L.L.P.

(57) ABSTRACT

An image coding apparatus includes a coding unit which generates coded data on a block basis, by coding the input image; a switching unit which selects and outputs either the coded data or uncompressed image data corresponding to the coded data; and a judging unit which judges, on a block basis, whether the code amount of the coded data is larger than a predetermined threshold. A control unit changes, to a predetermined specified coding type, the coding type of a first block and the coding type of a second block when the code amount of coded data generated by coding the first block is judged to be larger than the threshold, and the switching unit outputs the uncompressed image data corresponding to the coded data when the coding type of the coded data is the specified coding type.

4 Claims, 20 Drawing Sheets

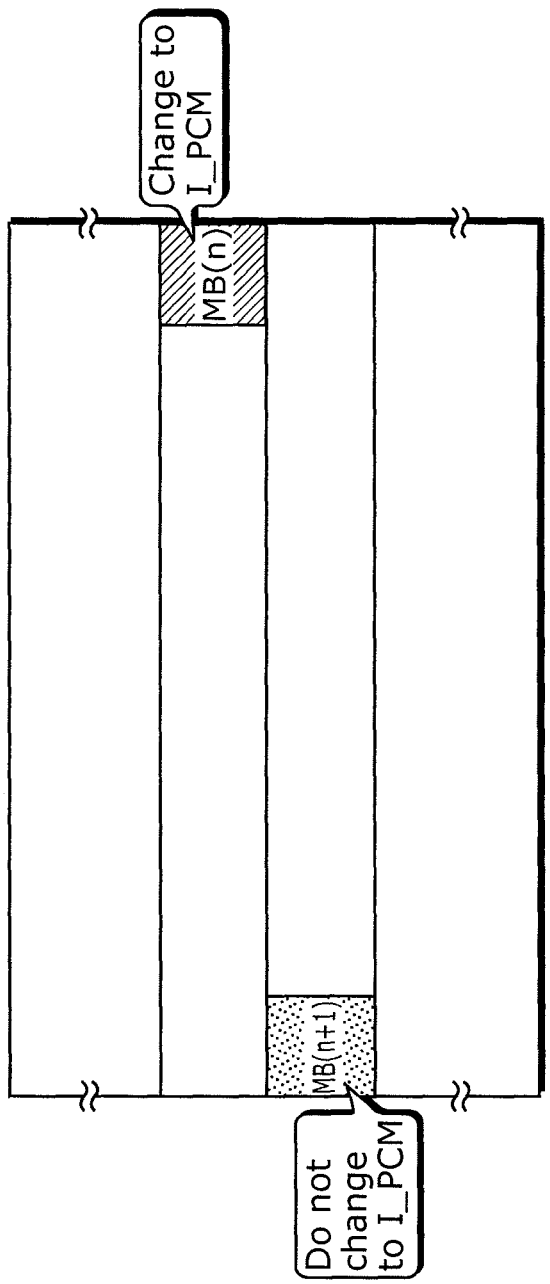

IMAGE CODING APPARATUS AND IMAGE CODING METHOD

BACKGROUND OF THE INVENTION (1) Field of the Invention

The present invention relates to an image coding apparatus and image coding method for coding video according to the H.264 standard.

(2) Description of the Related Art

In recent years, recording methods using the H.264 standard, which allows for a high coding-compression rate, are becoming predominant in the recording high-vision video using recording devices such as Blu-ray Disc (BD) recorders or Digital Versatile Disc (DVD) recorders and imaging devices such as camcorders.

In the H.264 standard, the maximum code amount per macroblock, which is a unit of coding, is limited, as described in Non-Patent Reference 1 (ISO/IEC 14496-10:2005). Specifically, the maximum code amount is defined to be 3200 bits in the case of the 8 bit 4:2:0 format.

When the code amount exceeds 3200 bits as a result of coding a macroblock, it is necessary to change the conditions for coding and perform coding on the macroblock again, as described in Patent Reference 1 (Japanese Unexamined Patent Application Publication No. 2004-135251). Alternatively, there is a method of setting the macroblock type of the macroblock to Intra macroblock_Pulse Code Modulation (I_PCM) and outputting uncompressed image data in place of coded data, without performing the re-coding of the macroblock whose code amount exceeds 3200 bits.

In such manner, conventionally, when the code amount of coded data exceeds the predetermined amount, a bit stream which conforms to the standard is generated by re-coding the current block to be coded or outputting uncompressed video data in place of coded data.

SUMMARY OF THE INVENTION

However, in the above-described conventional techniques, there is the problem that coding cannot be completed within a predetermined period. Specifically, this problem is described below.

When re-coding a macroblock as in the conventional method during coding in real time based on the H.264 standard, the number of macroblocks to be processed within a 1-picture period increases, and thus completing the process within a 1-picture period becomes impossible.

Furthermore, in the H.264 standard, information on neighboring macroblocks for which coding has already ended is used in processes such as intra prediction and motion prediction. As such, for example, when coding using hardware having a pipeline structure, in order to re-code a macroblock whose code amount exceeds 3200 bits, it is necessary to temporarily stop the hardware processing and re-code several macroblocks following the current macroblock. As a result, it becomes impossible to complete processing within a 1-picture period.

Consequently, the present invention is conceived in view of the above-described circumstances and has as an object to provide an image coding apparatus and an image coding method capable of completing the coding process within a predetermined period.

In order to solve the above-described problem, the image coding apparatus according to an aspect of the present invention is an image coding apparatus which codes an input image on a block basis by pipeline processing, the block consisting of pixels whose number is defined in a predetermined coding standard, the image coding apparatus including: a coding unit configured to generate coded data on a block basis, by coding the input image; a switching unit configured to select one of the coded data generated by the coding unit and uncompressed image data corresponding to the coded data, and to output the selected one of the coded data and the uncompressed image data; a judging unit configured to judge, on a block basis, whether or not a code amount of the coded data is larger than a threshold defined in the predetermined coding standard; and a control unit configured to change a coding type of a first block and a coding type of a second block to a specified coding type that is determined in advance, when the judging unit judges that a code amount of coded data generated by coding the first block is larger than the threshold, the first block being one of the blocks making up the input image, and the second block being at least one of blocks that are currently being pipeline-processed in the coding unit among the blocks making up the input image other than the first block, wherein the switching unit is configured to output the uncompressed image data corresponding to the coded data when the coding type of the coded data is the specified coding type.

Accordingly, since the coding type of at least two blocks, namely, the block whose code amount exceeds the threshold and the block currently being pipeline processed, the coding process can be completed within a predetermined period. Specifically, since the time needed for changing the predictive information can be secured by changing the coding type of the first block whose coding type needs to be changed due to the code amount exceeding the threshold and the second block which is currently being pipeline processed, it becomes possible to generate a bit stream that conforms to the standard.

Furthermore, the image coding apparatus according to an aspect of the present invention is an image coding apparatus which codes an input image on a block basis, the image coding apparatus including: a coding condition determining unit configured to determine a coding condition for each block; a predictive coding unit configured to generate transformed data by generating a predictive image based on the coding condition determined by the coding condition determining unit and performing orthogonal transform on a difference between the predictive image generated and the input image; a local decoding unit configured to generate a reconstructed image by performing inverse-transform on the transformed data generated by the predictive coding unit and adding the inverse-transformed data and the predictive image; a storage unit configured to store the reconstructed images generated by the local decoding unit; an entropy coding unit configured to generate coded data by performing entropy coding on the transformed data generated by the predictive coding unit; a switching unit configured to select one of the coded data generated by the entropy coding unit and uncompressed image data corresponding to the coded data, and to output the selected one of the coded data and the uncompressed image data; a judging unit configured to judge whether or not a code amount of the coded data generated by the entropy coding unit is larger than a threshold that is determined in advance; and a control unit configured to change a coding type of a first block and a coding type of a second block to a specified coding type that is determined in advance, when the judging unit judges that a code amount of coded data generated by coding the first block is larger than the threshold, the first block being one of the blocks making up the input image, and the second block being at least one of the blocks that are not yet coded, wherein the switching unit is configured to output the uncompressed image data corresponding to the coded data when the coding type of the coded data is the specified coding type.

Accordingly, it becomes possible to complete the coding process within a predetermined period. This is because, although the predictive information needs to be changed due to the changing of the coding type of the block for which the code amount exceeds the threshold, the coding type of another block is also changed in the present invention in order to secure the time needed for such changing of the predictive information.

Furthermore, the predictive coding unit and the entropy coding unit may be configured to perform pipeline processing having n-stages (where n is an integer equal to or greater than 2).

Accordingly, implementation by a pipeline structure allows for faster execution of the coding process. When implementing processes using the pipeline structure, it is particularly necessary to complete the processes within a specified period. This is because all processes have to be stopped when even just one of the pipelined processes does not end within the specified period.

Furthermore, the switching unit may be configured to output a reconstructed image stored in the storage unit and corresponding to the coded data, when the coding type of the coded data is the specified coding type.

Accordingly, a reconstructed image (locally decoded image) generated during a coding process using prediction can be used as the coded data of a block that has been changed to the specified coding type, and thus the configuration of the image coding apparatus can be simplified.

Furthermore, the control unit may be further configured to change, to a non-zero value, pixel values of reconstructed images stored in the storage unit and corresponding respectively to the first block and the second block whose coding types have been changed to the specified coding type.

Accordingly, for example, the H.264 standard does not allow the value of a block of the specified coding type (I_PCM) to be 0, as is also indicated conventionally. Therefore, by changing, to a non-zero value, the pixel values of the reconstructed image to be outputted as an output stream, it becomes possible to output an output stream that conforms to the standard.

Furthermore, the control unit may be configured to change the coding type of the first block and the coding type of the second block to the specified coding type when the judging unit judges that the code amount of the coded data generated by coding the first block is larger than the threshold, the second block being a block for which at least prediction by the predictive coding unit is finished and on which coding by the entropy coding unit is not yet performed.

Accordingly, when the pixel values of the reconstructed image are changed, the mismatching at the decoder-side can be overcome by changing, to the specified coding type, the coding type of the block that uses such reconstructed image during the generation of a predictive image. Specifically, in order to generate a predictive image using the reconstructed image before the pixel values are changed and to accurately decode, in the decoder-side, the block coded using the generated predictive image, an image that is the same as the reconstructed image used in the coding is needed. However, since the reconstructed image after the pixel values are changed is inputted as the output stream to the decoder-side, the image cannot be accurately decoded at the decoder-side. Therefore, by changing, to the specified coding type, the coding type of the block that uses the reconstructed image whose pixel values have been changed, and outputting the reconstructed image as the output stream, the image can be decoded accurately.

Furthermore, the image coding apparatus may further include an image storage unit configured to store the input image on a block basis, wherein the switching unit is configured to output the input image stored in the image storage unit and corresponding to the coded data, when the coding type of the coded data is the specified coding type.

Accordingly, since the input image can be used as the coded data of the block that has been changed to the specified coding type, a decoded image that is closer to the input image can be generated at the decoder-side.

Furthermore, the image storage unit may be configured to replace, with pixel values of the input image corresponding to coded data whose coding type has been changed to the specified coding type by the control unit, pixel values of the reconstructed image stored in the storage unit and corresponding to the coded data.

Accordingly, since the reconstructed image is replaced with the input image (block image) outputted as the output stream, a block to be coded after the current block to be coded can be coded by referring to the input image (block image). Therefore, the mismatching at the decoder-side can be overcome.

Furthermore, when the judging unit judges that the code amount of the coded data is larger than the threshold, the control unit may be configured to: change the coding type of the second block to the specified coding type when the coding type of the second block is intra; and generate predictive information of the second block and change the coding type of the second block to one of inter, skip, and direct when the coding type of the second block is one of inter, skip, and direct.

Accordingly, the unnecessary changing of more blocks to the specified coding type can be prevented. This is because, the reconstructed image corresponding to the block that has been changed to the specified coding type is not referred to in the coding of a current block to be coded whose coding type is inter, skip, or direct. For example, during the coding of a current block to be coded whose coding type is inter, the predictive image is generated by referring to an already-coded picture that does not include the current block to be coded.

Furthermore, when the judging unit judges that the code amount of the coded data is larger than the threshold, the control unit may be configured to change, to I_PCM, the coding type of only the second blocks up to an appearance of a block having a coding type that is one of skip, direct, and inter among the blocks that are not yet coded.

Furthermore, the judging unit may be configured to estimate the code amount of the coded data generated by the entropy coding data based on the transformed data generated by the predictive coding unit, and to judge whether or not the estimated code amount is larger than the threshold.

Accordingly, it becomes possible to judge whether or not the code amount to be generated will exceed the threshold, without having to code all the blocks.

Furthermore, the entropy coding unit may include: a binarization unit configured to generate binary data by binarizing the transformed data; and an arithmetic coding unit configured to perform arithmetic coding on the binary data so as to output the coded data.

Furthermore, the judging unit may be configured to estimate the code amount of the coded data based on the binary data generated by the binarization unit, and to judge whether or not the estimated code amount is larger than the threshold.

Furthermore, the control unit may be configured to change, to the specified coding type, only the coding type of the first block out of the first block and the second block, when the first block and the second block are not spatially adjacent to each other.

It should be noted that the present invention can be implemented, not only as an image coding apparatus, but also as a method having, as steps, the processing units included in such image coding apparatus. Furthermore, the present invention can also be implemented as a program which causes a computer to execute such steps. In addition, the present invention may also be implemented as a recoding medium such as a computer-readable Compact Disk-Read Only Memory (CD-ROM) on which such program is recorded, and as information, data, or a signal representing such program. In addition, such program, information, data and signal may be distributed via a communication network such as the Internet.

Furthermore, a portion or all of the constituent elements of the respective image coding apparatuses may be structured as a single system Large Scale Integration (LSI). The system LSI is a super multi-functional LSI manufactured by integrating a plurality of structural units onto a single chip. Specifically, it is a computer system configured by including a microprocessor, a ROM, a Random Access Memory (RAM), and the like.

The present invention can complete the coding process within a predetermined period and generate a bit stream that conforms to the standard.

FURTHER INFORMATION ABOUT TECHNICAL BACKGROUND TO THIS APPLICATION

The disclosure of Japanese Patent Application No. 2009-022020 filed on Feb. 2, 2009 including specification, drawings and claims is incorporated herein by reference in its entirety.

BRIEF DESCRIPTION OF THE DRAWINGS

These and other objects, advantages and features of the invention will become apparent from the following description thereof taken in conjunction with the accompanying drawings that illustrate a specific embodiment of the invention. In the Drawings:

FIG. 20 is a schematic diagram for describing the changing of the coding type in accordance with the position of a macroblock.

DETAILED DESCRIPTION OF THE INVENTION

Hereinafter, the present embodiment shall be described with reference to the Drawings. It should be noted that, although the following embodiments and the attached Drawings are used to describe the present invention, they are intended to be examples, and the present invention is not intended to be limited to such.

First Embodiment

An image coding apparatus in a first embodiment codes an input image on a per block basis and, when the code amount of coded data generated by coding a first block is larger than a predetermined threshold, changes, to a specified coding type, the coding type of the first block and the coding type of a second block which is at least one block for which coding is not yet completed. Subsequently, the image coding apparatus outputs, in place of the coded data, a reconstructed image generated by coding the first block and the second block that have been changed to the specified coding type and locally decoding the coded first block and second block. With this, it is possible to complete the coding process within a predetermined period and generate a bit stream which conforms to the standard.

It should be noted that the coded data is the data generated by coding a current macroblock to be coded.

Figure 1:
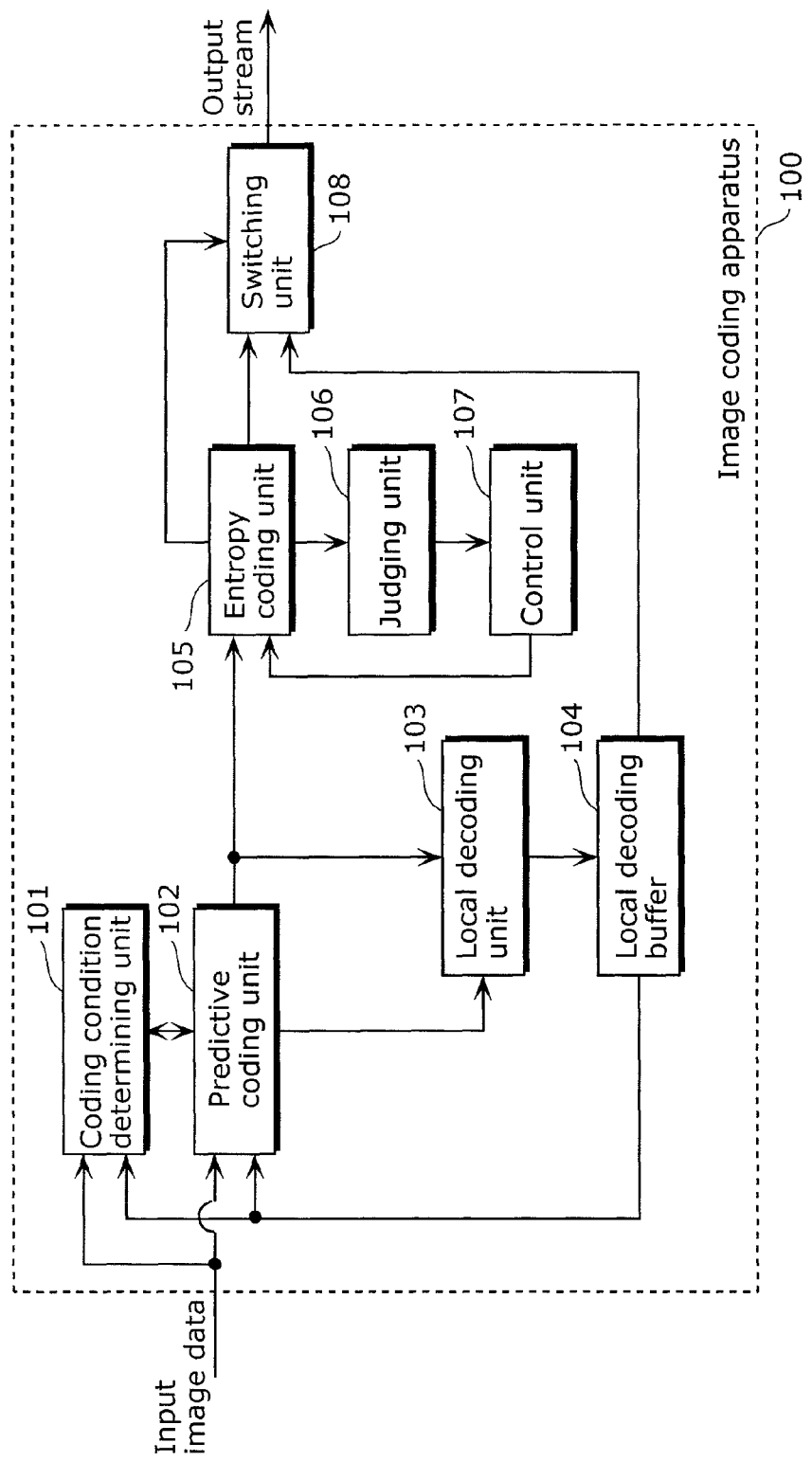
FIG. 1 is a block diagram showing the configuration of an image coding apparatus in a first embodiment.

FIG. 1 is a block diagram showing the configuration of an image coding apparatus 100 in the first embodiment. As shown in FIG. 1, the image coding apparatus 100 includes a coding condition determining unit 101, a predictive coding unit 102, a local decoding unit 103, a local decoding buffer 104, an entropy coding unit 105, a judging unit 106, a control unit 107, and a switching unit 108.

It should be noted that, as a premise, the image coding apparatus 100 in the present embodiment codes input image data on a per macroblock (hereafter denoted as "MB") basis based on the H.264 standard. Furthermore, as a premise, the coding process on a per MB basis is executed based on hardware having a pipeline structure. It should be noted that an MB is made up of 16×16 pixels for example.

The coding condition determining unit 101 determines the coding conditions for each MB. For example, the coding condition determining unit 101 determines the coding conditions for a current MB to be coded. Specifically, the coding condition determining unit 101 determines, using input image data and a locally decoded image, MB coding conditions such as: the MB type (coding type); the intra prediction size and direction; the information regarding motion compensation such as the motion compensation size, the image to be referred to, the motion vector, and the predictive vector; the quantization parameters, the orthogonal transform size, and so on.

Here, the MB types (coding types) include an intra macroblock to which intra prediction is applied and an inter macroblock to which inter prediction is applied.

Figure 2:
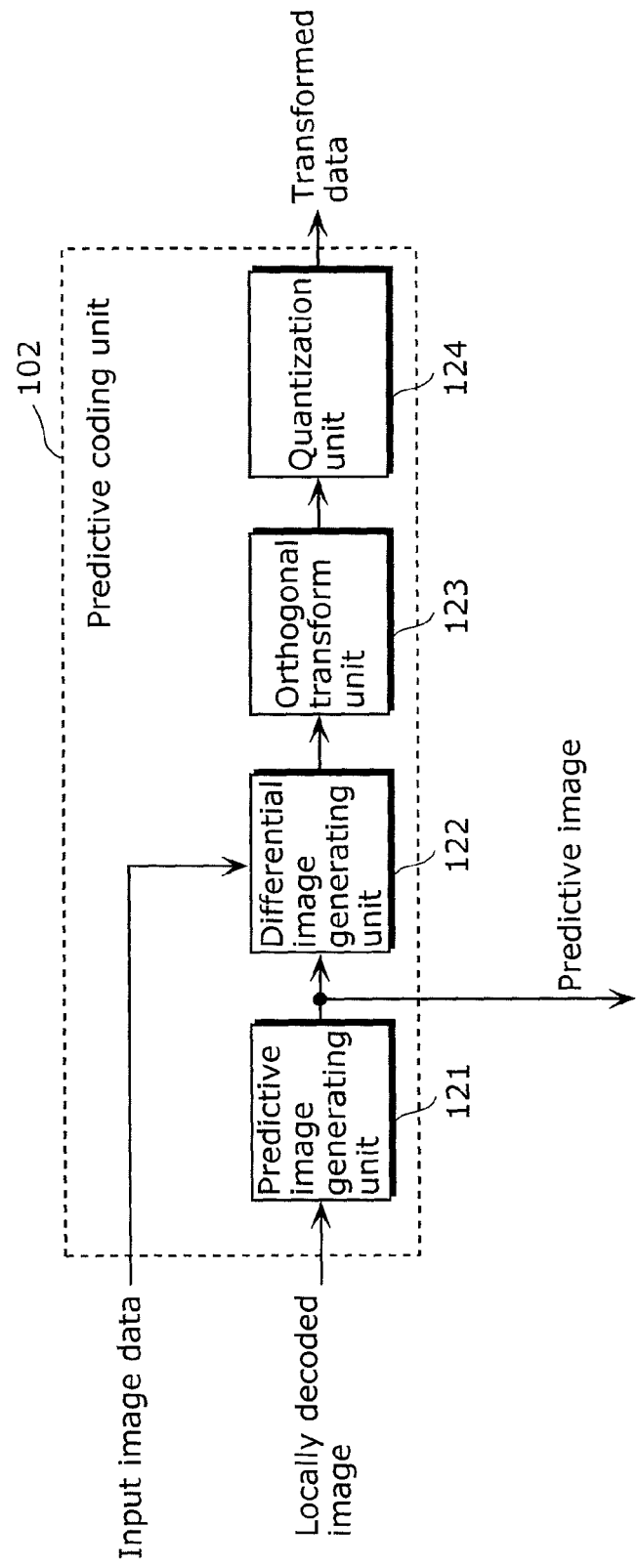
FIG. 2 is a block diagram showing the detailed configuration of a predictive coding unit.

The predictive coding unit 102 performs prediction and conversion on the input image data on a per MB basis, based on the MB coding conditions determined by the coding condition determining unit 101. Specifically, as shown in FIG. 2, the predictive coding unit 102 includes a predictive image generating unit 121, a differential image generating unit 122, an orthogonal transform unit 123, and a quantization unit 124.

The predictive image generating unit 121 generates a predictive image (predictive block) from a locally decoded image, based on intra prediction, when the MB type of the current MB to be coded is intra macroblock. The predictive image generating unit 121 generates a predictive image (predictive block) from a locally decoded image, using motion compensation, when the MB type of the current MB to be coded is inter macroblock.

The differential image generating unit 122 generates a differential image (differential block) by calculating, on a per pixel basis, the difference between the predictive image generated by the predictive image generating unit 121 and the current MB to be coded of the input image data.

The orthogonal transform unit 123 generates orthogonally-transformed data by performing orthogonal transform on the differential image on an 8×8 or 4×4 block-size basis, based on the orthogonal transform size in the MB coding conditions.

The quantization unit 124 generates transformed data by quantizing the orthogonally-transformed data, based on the quantization value, the quantization parameters, the quantization matrix, and the like, in the MB coding conditions.

Returning to FIG. 1, the local decoding unit 103 inverse-transforms the transformed data generated by the predictive coding unit 102, and generates a locally decoded image (locally decoded block), which is an example of a reconstructed image, by adding up the inverse-transformed data and the predictive image.

The local decoding buffer 104 is an example of a storage unit for storing reconstructed images, and is a memory for storing locally decoded images generated on a per MB basis by the local decoding unit 103.

The entropy coding unit 105 generates coded data by performing entropy coding on the transformed data generated by the predictive coding unit 102 and the MB coding conditions. Specifically, the entropy coding unit 105 codes information serving as a syntax component included in the MB coding conditions, using Golomb coding. Subsequently, the entropy coding unit 105 codes the transformed data generated by the predictive coding unit 102 using the Context-Adaptive Variable Length Coding (CAVLC) method.

The judging unit 106 compares the code amount of the coded data generated by the entropy coding unit 105 and a predetermined threshold, and judges, on a per block basis, whether or not the code amount exceeds the threshold. The threshold is, for example, the maximum code amount when one macroblock is coded, as defined in a coding standard. In the H.264 standard, the judging unit 106 judges whether or not the code amount of the current MB to be coded exceeds 3200 bits.

The control unit 107 re-sets the MB type of the current MB to be coded, based on the result of the judgment by the judging unit 106. Specifically, when it is judged that the code amount of the coded data exceeds the threshold, the control unit 107 changes the MB type of the current MB to be coded to a specified coding type, that is, I_PCM. In addition, the control unit 107 changes, to I_PCM, the MB type of at least one MB out of the MBs for which the coding process has not yet been completed up to the entropy coding by the entropy coding unit 105. In other words, together with changing the MB type of a first MB to I_PCM, the control unit 107 also changes the MB type of a second MB to an I_PCM macroblock. The second MB is an MB whose coding order is successive to the first MB, and is for example the right-adjacent MB to the first MB.

It should be noted that, in the case of an MB of the specified coding type (I_PCM macroblock), the image coding apparatus 100 in the present embodiment outputs the image data of the MB as uncompressed data, without outputting coded data that can be obtained by coding the image data of the MB. Specifically, the image coding apparatus 100 outputs image data corresponding to the image data of an MB, which has been changed to the specified coding type out of the image data included in the locally decoded image, as the uncompressed data of such MB.

The switching unit 108 selects and outputs one of the coded data generated by the entropy coding unit 105 and the uncompressed image corresponding to such coded data. Here, the switching unit 108 selects and outputs one of the coded data and the locally decoded image which is stored in the local decoding buffer 104.

Specifically, when the MB type of the current MB to be coded is I_PCM macroblock, the switching unit 108 outputs, as an output stream, the image data corresponding to the current MB to be coded out of the image data included in the locally decoded image, from the local decoding buffer 104. Furthermore, when the MB type is other than I_PCM, the switching unit 108 outputs the coded data generated by the entropy coding unit 105 as an output stream.

Next, the operation of the image coding apparatus 100 in the present embodiment shall be described. Since the input image is coded on a per MB basis in the present embodiment, the sequence of processes executed on one MB shall be described.

Figure 3:
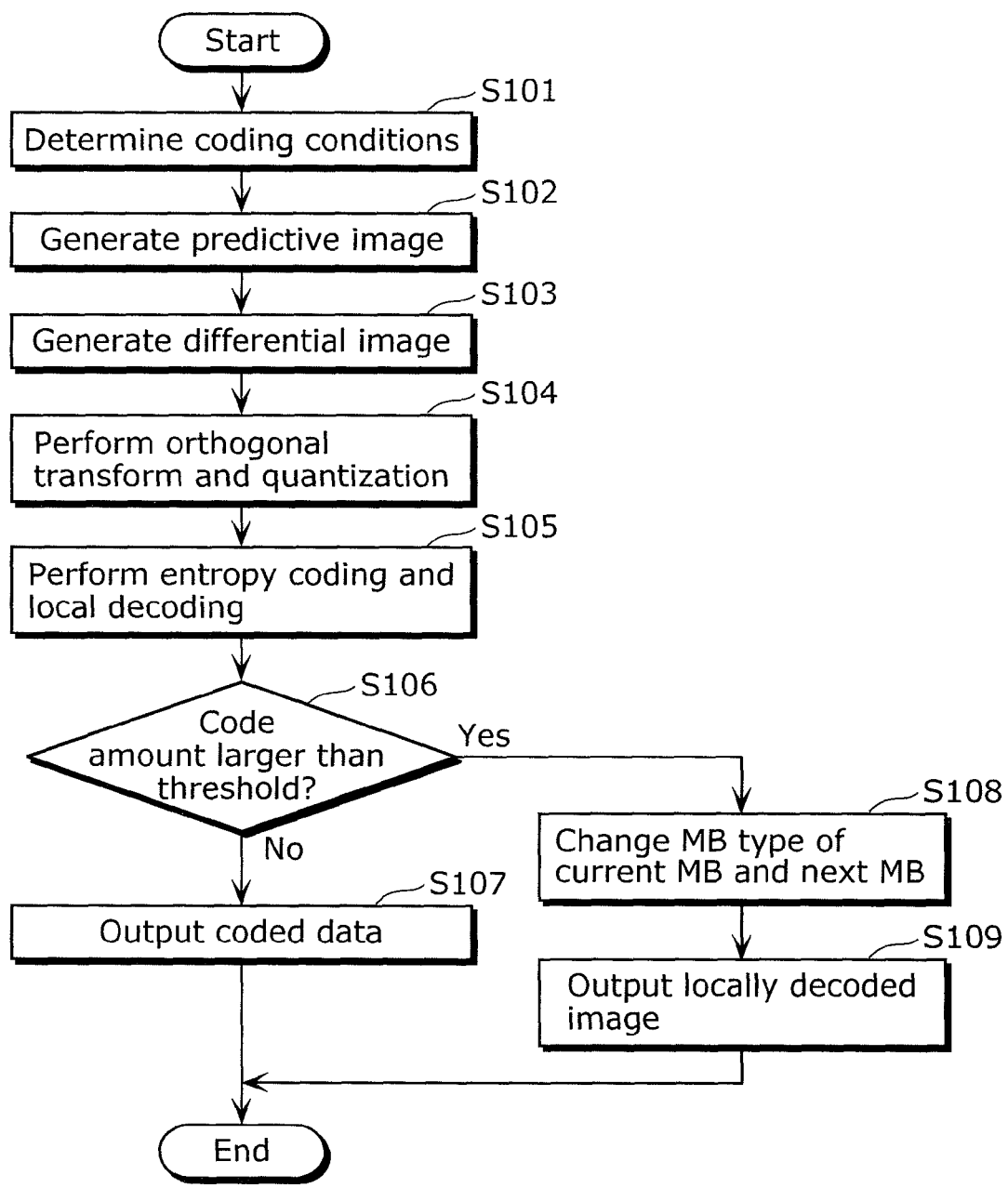
FIG. 3 is a flowchart showing the operation of the image coding apparatus in the first embodiment.

FIG. 3 is a flowchart showing the operation of the image coding apparatus 100 in the first embodiment.

First, the coding condition determining unit 101 determines the coding conditions for a current MB to be coded (S101). Next, the predictive image generating unit 121 generates a predictive image (predictive block) by performing intra prediction or inter prediction using a locally decoded image, depending on the MB type of the current MB to be coded.

Next, the differential image generating unit 122 generates a differential image (differential block) by calculating, on a per pixel basis, the difference between the current MB to be coded and the predictive block (S103). In addition, the orthogonal transform unit 123 generates orthogonally-transformed data by performing orthogonal transform on the differential block, and the quantization unit 124 quantizes the orthogonally-transformed data (S104). At this time, the orthogonal transform size for the orthogonal transform, the quantization value and the quantization parameters, and so on, are determined according to the coding conditions (determined in S101).

Next, the entropy coding unit 105 generates coded data by performing entropy coding on the transformed data that has been quantized by the quantization unit 124 (S105). At this time, the local decoding unit 103 inverse-transforms the transformed data, and generates a locally decoded image (locally decoded block) by adding up the inverse-transformed data and the predictive block.

The judging unit 106 judges whether or not the code amount of the coded data generated by the entropy coding unit 105 exceeds a threshold (3200 bits) (S106). When the code amount is equal to or less than 3200 bits (No in S106), the switching unit 108 outputs the coded data as the output stream (S107).

When the code amount exceeds 3200 bits (Yes in S106), the control unit 107 changes, to I_PCM, the MB type of the MB corresponding to the coded data and the MB type of the next MB (S108). It should be noted that the next MB is an MB having a coding order in which it is to be coded next after the current MB to be coded (the MB corresponding to the coded data), and is an MB that is adjacent to the current MB to be coded. Specifically, the switching unit 108 reads the locally decoded block corresponding to the current MB to be coded from the local decoding buffer 104, and outputs the read locally decoded block as an output stream (S109).

Focusing on one MB, the image coding apparatus 100 in the present embodiment codes an input image on a per MB basis in the above manner. The image coding apparatus 100 in the present embodiment implements all the processes using a pipeline structure and plural MBs are processed simultaneously.

It should be noted that, as described above, with the changing of the MB type of the current MB to be coded to I_PCM, the coding type of the next MB is also changed to I_PCM (S108). Therefore, in the coding of the next MB, there is no need to perform entropy coding, and a locally decoded image is generated and image data corresponding to the next MB out of the image data included in the generated locally decoded image may be outputted directly as an output stream.

Figure 4:
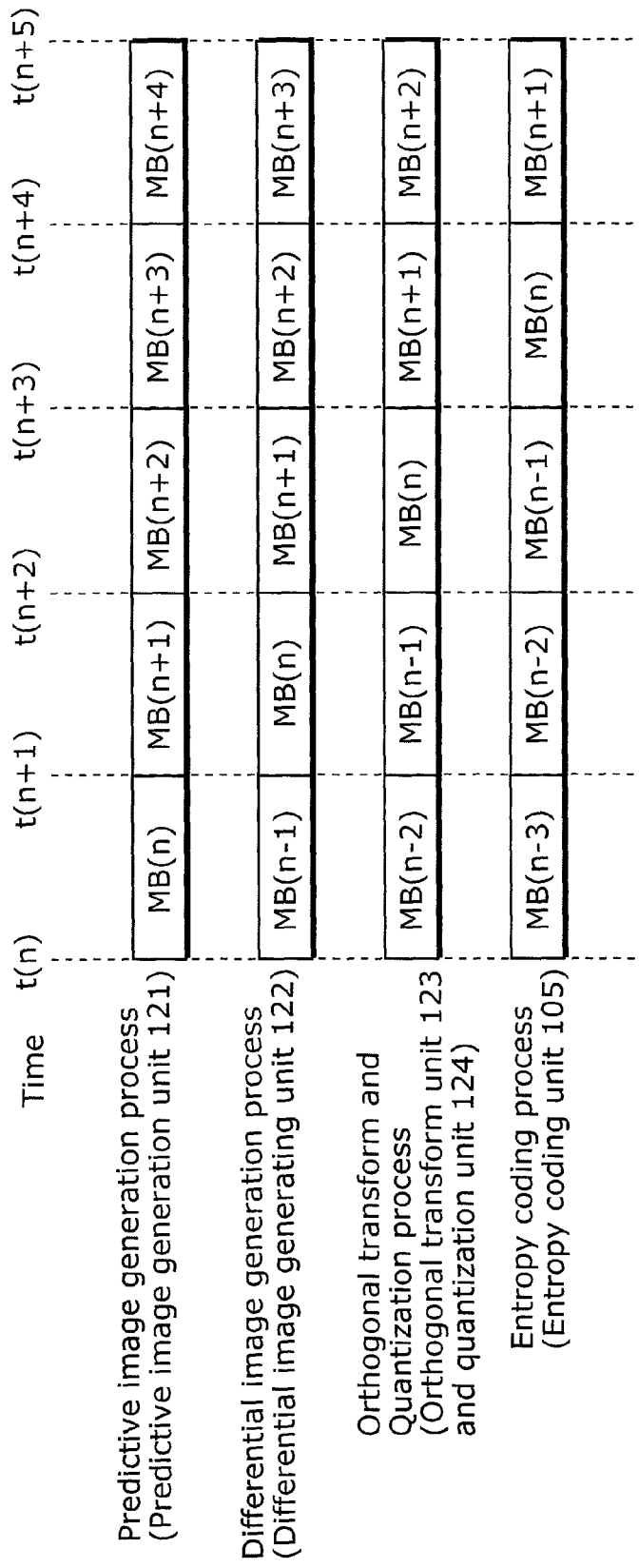
FIG. 4 is a diagram showing an example of the performance of a coding process using a pipeline structure.

FIG. 4 is a diagram showing the coding process being implemented using the pipeline process. Here, as an example, the predictive image generation process, the differential image generation process, the orthogonal transform and quantization process, and the entropy coding process are described as being a pipeline structure, as in FIG. 4.

MB(n) in the diagram denotes an nth MB when the MB on the top left of a picture is assumed to be MB(0) and MB addresses are assigned from left to right and top to bottom. In the case of a pipeline structure, the above-mentioned four processes are performed in parallel on different MBs. For example, at a time t(n+4) at which the entropy coding process for MB(n) ends, the processing of MB(n+1), which is the right-adjacent MB to MB(n), is finished up to the orthogonal transform and quantization process.

Here, description shall be made for the case where the MB type of MB(n) is changed to I_PCM at the time t(n+4). Specifically, the case where the code amount of the coded data corresponding to MB(n) exceeds 3200 bits when the entropy coding unit 105 codes MB(n) shall be described.

Figure 5:
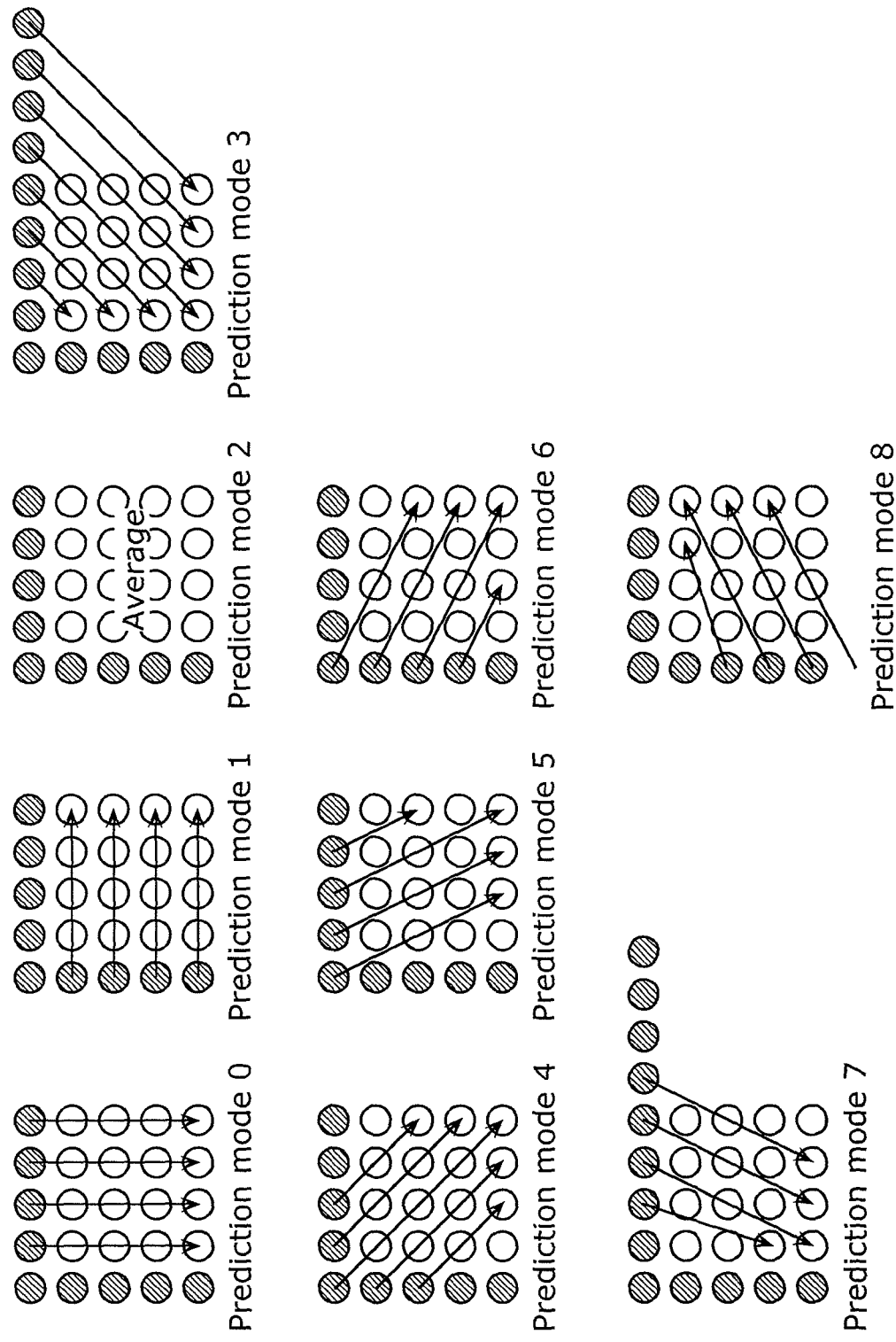
FIG. 5 is a diagram showing the prediction directions in intra prediction.

In the H.264 standard, prediction using information of neighboring MBs is performed. For example, in the case of an intra MB, prediction is performed using the pixel values of the locally decoded image of neighboring MBs, as shown in FIG. 5. Furthermore, in the case of an inter MB, a predictive vector is generated from motion vector information of neighboring MBs.

When, as a result of the entropy coding process, the code amount of the coded data exceeds the threshold, the MB type of MB(n) is changed to I_PCM. As such, it is necessary to change the predictive information, such as the predictive vector and so on, of MB(n+1) which is the right-adjacent MB to MB(n). However, since it is necessary to change the predictive information immediately before performing the entropy coding process on MB(n+1), the processing amount goes over the predetermined time and the pipeline structure cannot be maintained.

Figure 6:
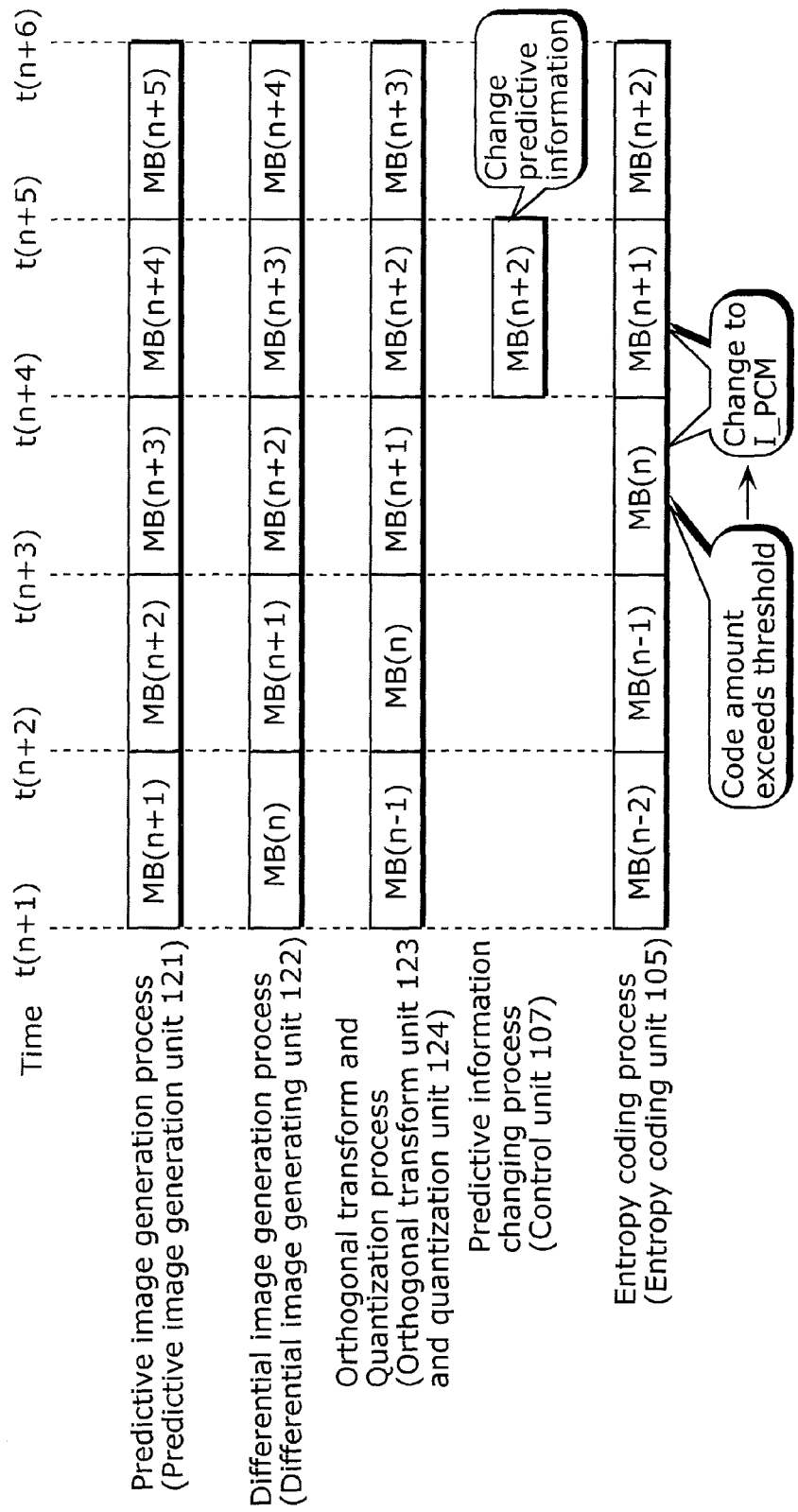
FIG. 6 is a diagram showing an example of a case of performing the coding process in the first embodiment using a pipeline structure.

Consequently, by likewise changing the MB type of MB(n+1) to I_PCM as shown in FIG. 6, the need to change the predictive information of MB(n+1) is eliminated. Subsequently, by changing the predictive information of MB(n+2) in parallel with the period in which the orthogonal transform and quantization process on MB(n+2) is being performed, the impact on the time needed for the process of predictive information changing can be lessened.

As described above, when the code amount of the coded data of the first MB exceeds the threshold, the image coding apparatus 100 in the present embodiment changes the MB type of the first MB to I_PCM and, in addition, also changes the MB type of at least one second MB, which is successive to the first MB, to I_PCM. At this time, the image coding apparatus 100 outputs, as an output stream, image data corresponding to the MB that has been changed to an I_PCM macroblock out of the image data included in the locally decoded image.

With this, the predictive information of a third MB which is successive to the second MB can be generated in the period in which the entropy coding of the second MB is being performed, and thus the pipeline structure can be maintained. Furthermore, even when not implemented using the pipeline structure, the coding process can be finished within the specified period.

Second Embodiment

An image coding apparatus in a second embodiment is characterized by changing, to non-zero values, the pixel values of a locally decoded image of a block that has been changed to a specified coding type. With this, it is possible to generate a bit stream which conforms to the standard.

Figure 7:
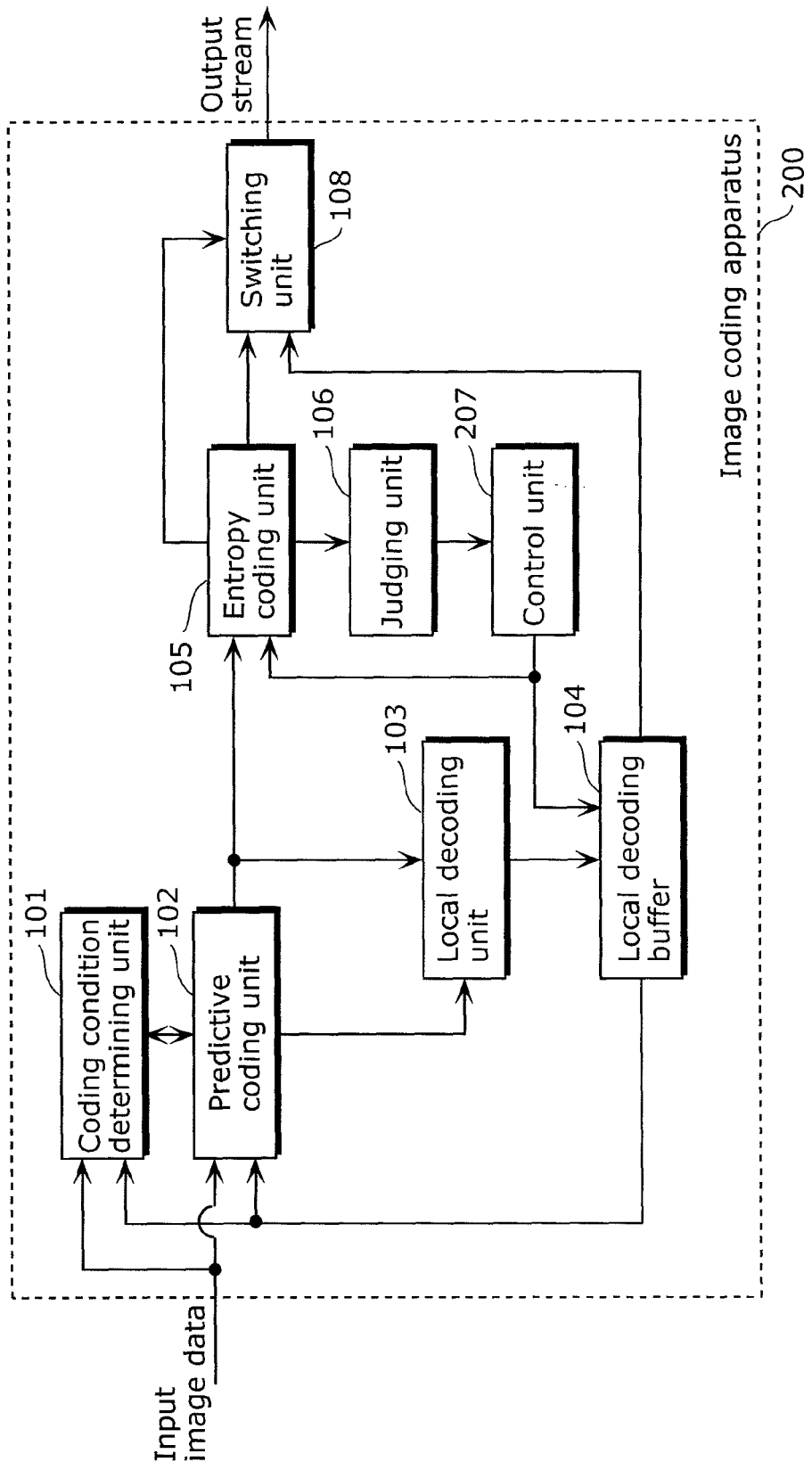
FIG. 7 is a block diagram showing the configuration of an image coding apparatus in a second embodiment.

FIG. 7 is a block diagram showing the configuration of an image coding apparatus 200 in the second embodiment. The image coding apparatus 200 shown in the diagram is different compared to the image coding apparatus 100 in FIG. 1 in including a control unit 207 in place of the control unit 107. Hereinafter, description of points which are the same as in the first embodiment shall be omitted and description shall be focused on the points of difference.

It should be noted that, as a premise, the image coding apparatus 200 in the present embodiment codes an input image based on the Baseline Profile or Main Profile in the H.264 standard. Furthermore, as a premise, the coding process on a per MB basis is executed based on hardware having a pipeline structure.

In the Baseline Profile and the Main Profile, there is a constraint that the pixel values of an I_PCM MB have to be non-zero values. As such, a pixel value of 0 must be changed to a non-zero value (for example, 1).

Consequently, the control unit 207 changes, to I_PCM, the MB type of the current MB to be coded and the MB type of an MB for which coding has not yet finished, based on the judgment result of the judgment unit 106. In addition, when any of the pixel values (hereafter denoted as current pixel values) which correspond to the MB that has been changed to an I_PCM macroblock out of the pixel values included in the locally decoded image stored in the local decoding buffer 104 is 0, the control unit 207 changes such current pixel value to a non-zero value (for example, 1).

After changing the current pixel value to a non-zero value, the control unit 207 outputs the changed pixel values as an output stream.

In the case where there is an MB for which coding has already started using the current pixel values as predictive image data when the above-described pixel value changing process is performed, the coded data generated by completing, as is, the coding of such MB cannot be decoded accurately since it will be decoded at the decoder-side using a different predictive image (specifically, the locally decoded image after the pixel value changing).

In order to accurately decode, at the decoder-side, an MB that is coded according to the prediction process, an image that is the same as the predictive image used at the time of coding is needed at the decoder-side. However, the output stream includes: the MB coded using, as predictive image data, the current pixel values before changing; and the current pixel values after the pixel value changing. As such, at the decoder-side, it will not be possible to decode the coded MB accurately since it is not possible to generate the current pixel values before the pixel value changing.

Therefore, when changing the MB type to I_PCM and changing the current pixel values to a non-zero value, the control unit 207 also changes, to I_PCM, the MB type of an MB that is currently being coded and for which the predictive image generating process has already ended. Accordingly, since it is possible to prevent having an MB that is coded using a different predictive image, the MB can be accurately decoded at the decoder-side.

Next, the operation of the image coding apparatus 200 in the present embodiment shall be described. In the present embodiment, since the input image is coded on a per MB basis, the sequence of processes executed on one MB shall be described.

Figure 8:
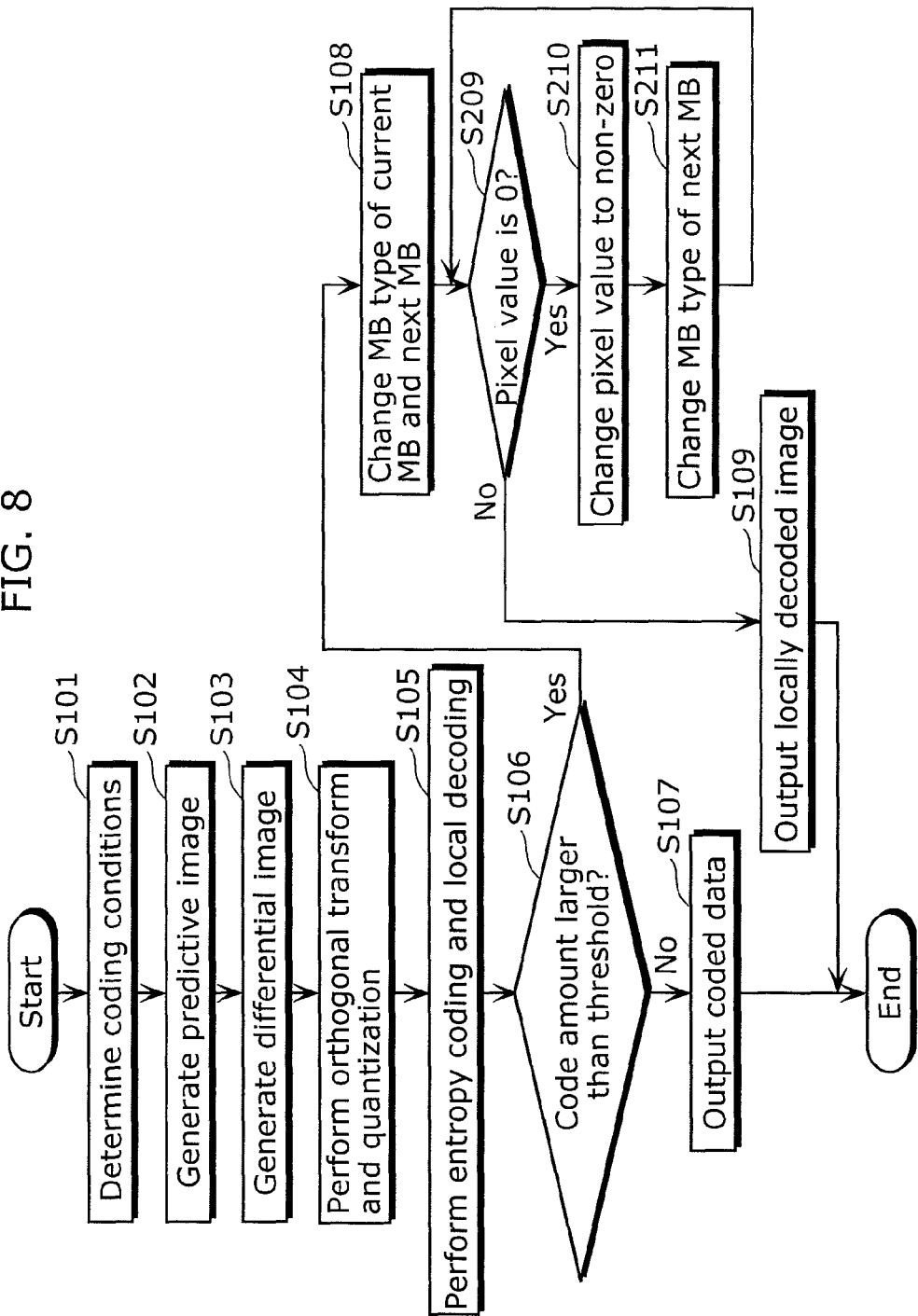
FIG. 8 is a flowchart showing the operation of the image coding apparatus in the second embodiment.

FIG. 8 is a flowchart showing the operation of the image coding apparatus 200 in the second embodiment. Processes that are the same as those in FIG. 3 are given the same numerical references and their description here shall be omitted. It should be noted that the case where MB(n) uses MB(n−1) during generation of a predictive image (the case of the prediction mode 1 in FIG. 5) shall be described hereinafter.

In the same manner as with the image coding apparatus 100 in the first embodiment, the image coding apparatus 200 performs, on the current MB to be coded, the processes from the coding condition determining process (S101) up to the code amount judgment process (S106).

When the code amount of the coded data is equal to or less than 3200 bits (No in S106), the switching unit 108 outputs the coded data as the output stream (S107).

When the code amount of the coded data exceeds 3200 bits (Yes in S106), the control unit 207 changes, to I_PCM, the MB type of the MB corresponding to the coded data (current MB to be coded) and the MB type of the next MB (S108). In addition, the control unit 207 judges whether or not each of the current pixel values stored in the local decoding buffer 104 is 0 (S209).

When a value 0 is present in the current pixel values (Yes in S209), the control unit 207 changes the pixel value of such pixel to a non-zero value (for example, 1) (S210). Since the predictive image for the next MB changes following the changing of the pixel value, the control unit 207, in addition, changes the MB type of the next MB to I_PCM (S211). It should be noted that the next MB described here is an MB that is coded next after the MB corresponding to the locally decoded block having the changed pixel value, and is an MB that is coded using, as a predictive image, the locally decoded block having the changed pixel value. Subsequently, the control unit 207 repeats the MB type changing process (S209 to S211) until a locally decoded block whose pixel values are all non-zero values appears.

When the pixel values are all non-zero values (No in S209), the switching unit 108 reads the locally decoded block corresponding to the current MB to be coded from the local decoding buffer 104, and outputs the read locally decoded block as an output stream (S109).

Focusing on one MB, the image coding apparatus 200 in the present embodiment codes an input image on a per MB basis in the above manner. The image coding apparatus 200 in the present embodiment implements all the processes using a pipeline structure and plural MBs are processed simultaneously.

Figure 9:
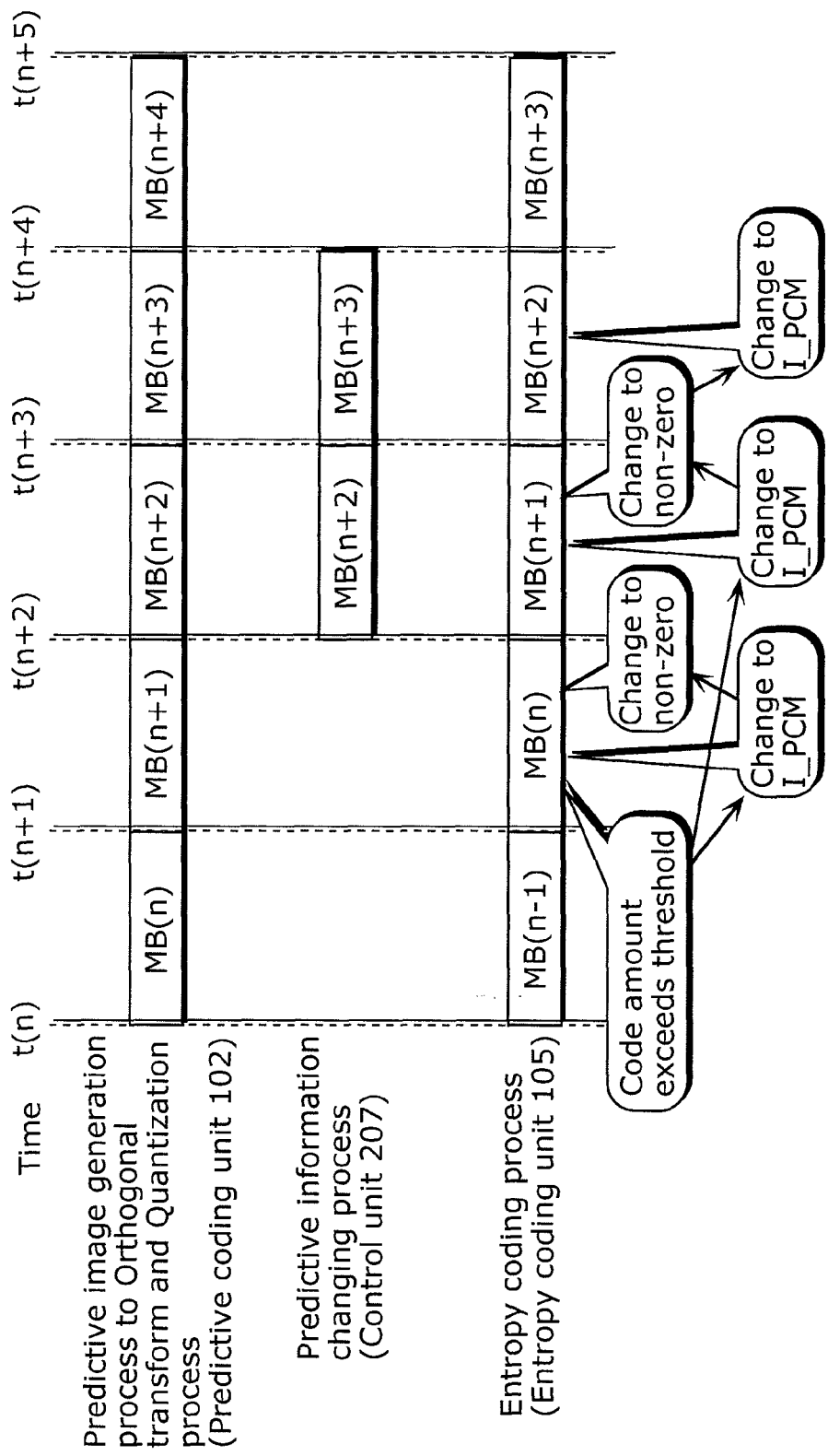
FIG. 9 is a diagram showing an example of a case of performing the coding process in the second embodiment using a pipeline structure.

Hereinafter, the case where the MB type of MB(n) is to be changed to I_PCM at a time t(n+2) while processing is performed using a pipeline structure as shown in FIG. 9. Specifically, the case where the code amount of the coded data corresponding to MB(n) exceeds 3200 bits when the entropy coding unit 105 codes MB(n) shall be described.

It should be noted that, here, it is assumed that the MB type of all the MBs is intra. Furthermore, it is assumed that the prediction mode at this time is the prediction mode 1 shown in FIG. 5, and the predictive block is generated using the pixel values of the pixels adjacent to the left of each MB (that is, the pixels on the right-end of a left-adjacent MB).

When, out of the pixel values of MB(n), the pixel value of any of the pixels located on the right-end of the MB is 0, the control unit 207 changes the current pixel value stored in the local decoding buffer 104, from 0 to 1. Here, since the prediction mode of the intra prediction is prediction mode 1, and the pixel whose pixel value has been changed is used in the generation of the predictive block for MB(n+1), the predictive image changes. As such, the control unit 207 also changes the MB type of MB(n+1) to I_PCM.

In addition, when the same conditions also apply to the MBs after MB(n+1), it is necessary to change, to I_PCM, the MB type of an MB for which the prediction image generating process has already ended at the time t(n+2) (only MB(n+1) in the example in FIG. 9). It should be noted that, in view of the processing time for changing pixel values from 0 to 1, it is also possible to change, to I_PCM, the MB type of MBs up to MB(n+2).

As shown in FIG. 9, when the code amount generated in the coding of MB(n) by the entropy coding unit 105 exceeds 3200 bits, the coding unit 207 changes the MB type of MB(n) and the MB type of MB(n+1) to I_PCM. Here, as described in the first embodiment, the MB type of MB(n+1) is also changed in order secure the time required for generating the predictive information for MB(n+2).

Here, when any of the right-end pixel values out of the current pixel values corresponding to each of MB(n) and MB(n+1) stored in the local decoding buffer 104 is 0, the control unit 207 changes such pixel to a non-zero value as shown in FIG. 9. Since the predictive image for MB(n+2) changes when a pixel value of the locally decoded block for MB(n+1) is changed, it is also necessary to change the MB type of MB(n+2) to I_PCM.

When the pixel values at the right-end of the local decoded block corresponding to MB(n+2) are all non-zero values, the predictive image does not change, and thus the MB type of MB (n+3) may be retained as intra. Furthermore, in the same manner, since the predictive image does not change when MB(n+2) is an MB having a prediction mode (for example, prediction mode 0) that does not use left-adjacent pixels, the MB type of MB (n+3) may be retained as intra.

It should be noted that, although it has been described thus far that the MB type of the next MB to the MB on which the non-zero changing is performed is changed, the MB for which the MB type is to be changed is different depending on the prediction mode. Specifically, it is necessary to change the MB type of an MB i) which, at the time of generating a predictive image, refers to the MB that has had non-zero changing performed thereon, and ii) for which predictive image generation using the pipeline structure is finished.

As described above, in the case where, in the changing of the MB type to I_PCM, a pixel having a pixel value of 0 is included in the locally decoded image corresponding to the MB whose MB type has been changed, the image coding apparatus 200 in the present embodiment changes the pixel value of such pixel to a non-zero value. At this time, the image coding apparatus 200 also changes, to I_PCM, the MB type of an MB which, in the generation of a predictive image, refers to the locally decoded image having the changed pixel value.

With this, even when the predictive image changes following the changing of the pixel value, it is possible to generate an output stream that can be decoded accurately at the decoder-side.

Third Embodiment

When a code amount of coded data generated by coding a first block exceeds a threshold, an image coding apparatus in a third embodiment changes, to a specified coding type, the coding type of a first block and the coding type of a second block which has a coding type of intra out of at least one block for which coding is not yet completed. Furthermore, for a block having a coding type of inter, skip, or direct out of the at least one block for which coding is not yet completed, the image coding apparatus in the third embodiment generates the predictive information and changes the coding type of such block to inter, skip, or direct.

Figure 10:
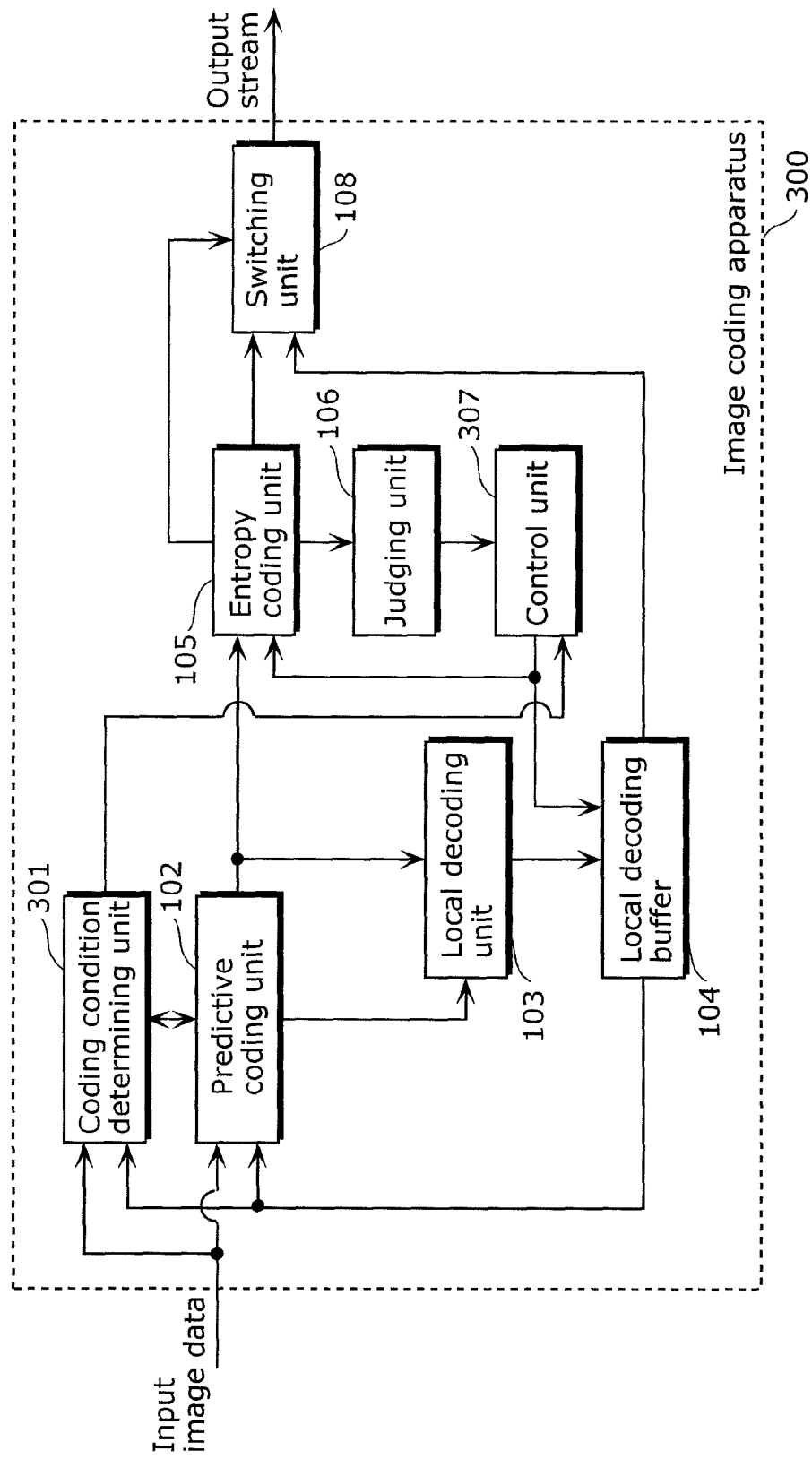
FIG. 10 is a block diagram showing the configuration of an image coding apparatus in a third embodiment.

FIG. 10 is a block diagram showing the configuration of an image coding apparatus 300 in the third embodiment. The image coding apparatus 300 shown in the diagram is different compared to the image coding apparatus 200 in FIG. 7 in including a coding condition determining unit 301 in place of the coding condition determining unit 101, and in including a control unit 307 in place of the control unit 207. Hereinafter, description of points which are the same as in the second embodiment shall be omitted and description shall be focused on the points of difference.

It should be noted that, as a premise, the image coding apparatus 300 in the present embodiment codes an input image based on the Baseline Profile or Main Profile in the H.264 standard. Furthermore, as a premise, the coding process on a per MB basis is executed based on hardware having a pipeline structure.

The coding condition determining unit 301 determines the coding conditions for a current MB to be coded, in the same manner as the coding condition determining unit 101. Furthermore, the coding condition determining unit 301 outputs the determined MB coding conditions not only to the predictive coding unit 102 but also to the control unit 307.

The control unit 307 changes, to I_PCM, the MB type of the current MB to be coded and the MB type of an MB for which coding has not yet finished, based on the judgment result of the judgment unit 106. However, at this time, the control unit 307 determines whether or not to change an MB type to I_PCM, based on the MB type determined by the coding condition determining unit 301. In addition, as with the control unit 207, when any of the current pixel values is 0, the control unit 307 changes such current pixel value to a non-zero value (for example, 1).

Specifically, in changing the MB type of the next MB following the changing of the pixel value, the control unit 307 judges the MB type of such MB. When the MB type of such MB is intra, the control unit 307 changes the MB type to I_PCM, as in the second embodiment.

When the MB type of such MB is any one of inter, direct, or skip (hereafter denoted as inter-series), the control unit 307 re-changes the MB type to the inter-series. This is because, in the case of an inter-series MB, the predictive image does not change even when a pixel value of the locally decoded image corresponding to the preceding MB is changed, and thus the predictive image that is currently being processed in the pipeline structure can be used as it is. However, at this time, since the MB type of the preceding MB has been changed, the predictive information must be changed.

Next, the operation of the image coding apparatus 300 in the present embodiment shall be described. In the present embodiment, since the input image is coded on a per MB basis, the sequence of processes executed on one MB shall be described.

Figure 11:
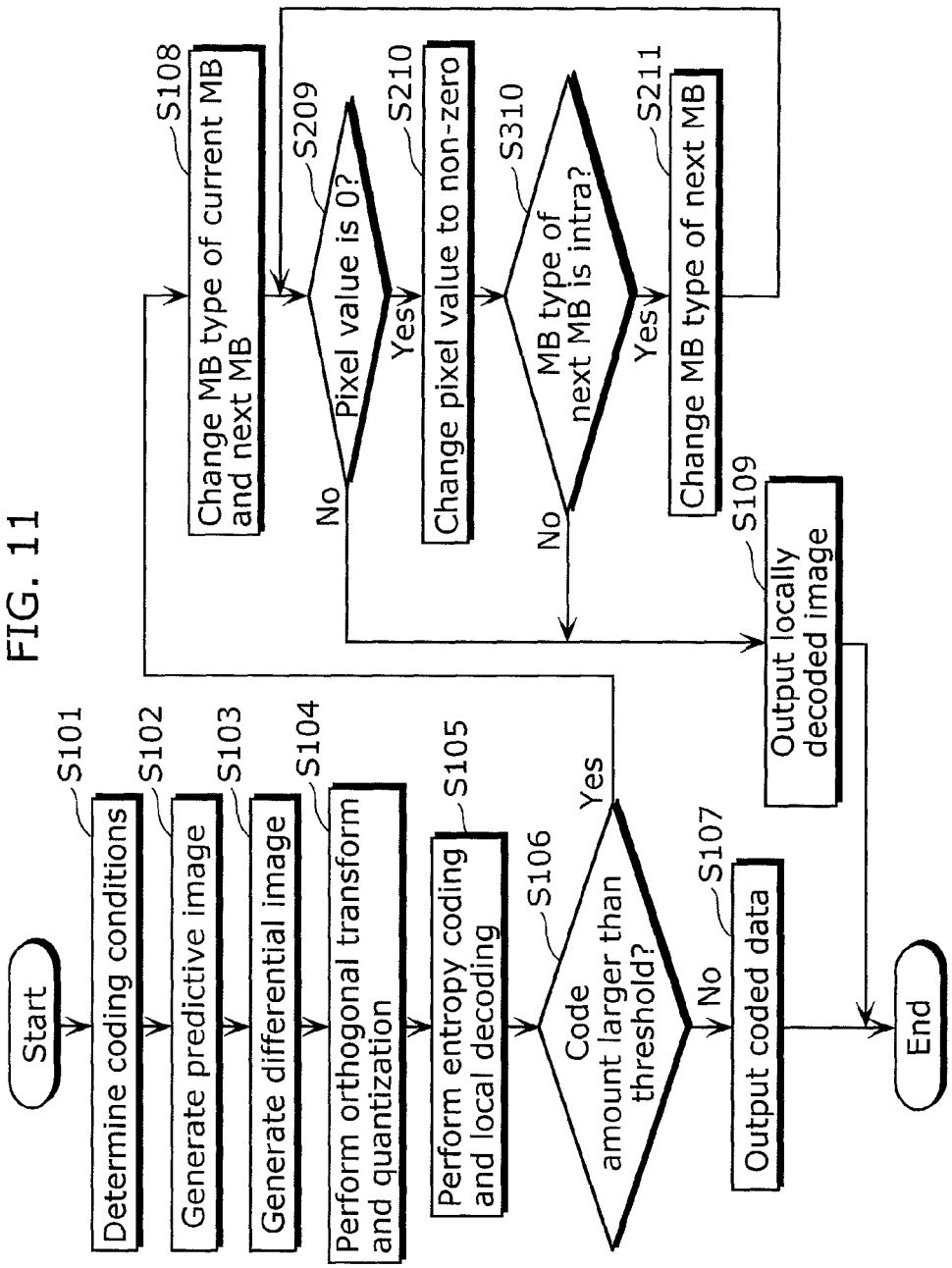
FIG. 11 is a flowchart showing the operation of the image coding apparatus in the third embodiment.

FIG. 11 is a flowchart showing the operation of the image coding apparatus 300 in the third embodiment. Processes that are the same as those in FIG. 8 are given the same numerical references and their description here shall be omitted.

In the same manner as in the second embodiment, the image coding apparatus 300 performs, on the current MB to be coded, the processes from the coding condition determining process (S101) up to the code amount judgment process (S106). Subsequently, when the code amount of the coded data exceeds 3200 bits (Yes in S106), the control unit 307 changes, to I_PCM, the MB type of the MB corresponding to the coded data (current MB to be coded) and the MB type of the next MB (S108). In addition, the control unit 307 judges whether or not a pixel having a pixel value of 0 is present among the pixels of the locally decoded block stored in the local decoding buffer 104 and corresponding to the MB whose MB type has been changed to I_PCM (S209).

When a pixel having a pixel value of 0 is present (Yes in S209), the control unit 307 changes the pixel value of such pixel to a non-zero value (for example, 1) (S210). Subsequently, the control unit 307 judges whether the MB type of the next MB is intra or inter (S310). It should be noted that, here, the next MB is an MB that is coded next after the MB corresponding to the locally decoded block having the changed pixel value and, in the case where its MB type is intra, is an MB that is coded using, as a predictive image, the locally decoded block having the changed pixel value.

When the MB type of the next MB is intra (Yes in S310), the control unit 307, in addition, changes the MB type of the next MB to I_PCM since the predictive image for the next MB changes following the changing of the pixel value (S211). Subsequently, the control unit 307 repeats the MB type changing process (S209 to S211) until a locally decoded block whose pixel values are all non-zero values appears.

When the MB type of the next MB is inter (No in S310) and when the pixel values are all non-zero values (No in S209), the switching unit 108 reads the locally decoded block corresponding to the current MB to be coded from the local decoding buffer 104, and outputs the read locally decoded block as an output stream (S109).

Focusing on one MB, the image coding apparatus 300 in the present embodiment codes an input image on a per MB basis in the above manner. The image coding apparatus 300 in the present embodiment implements all the processes using a pipeline structure and plural MBs are processed simultaneously.

Figure 12:
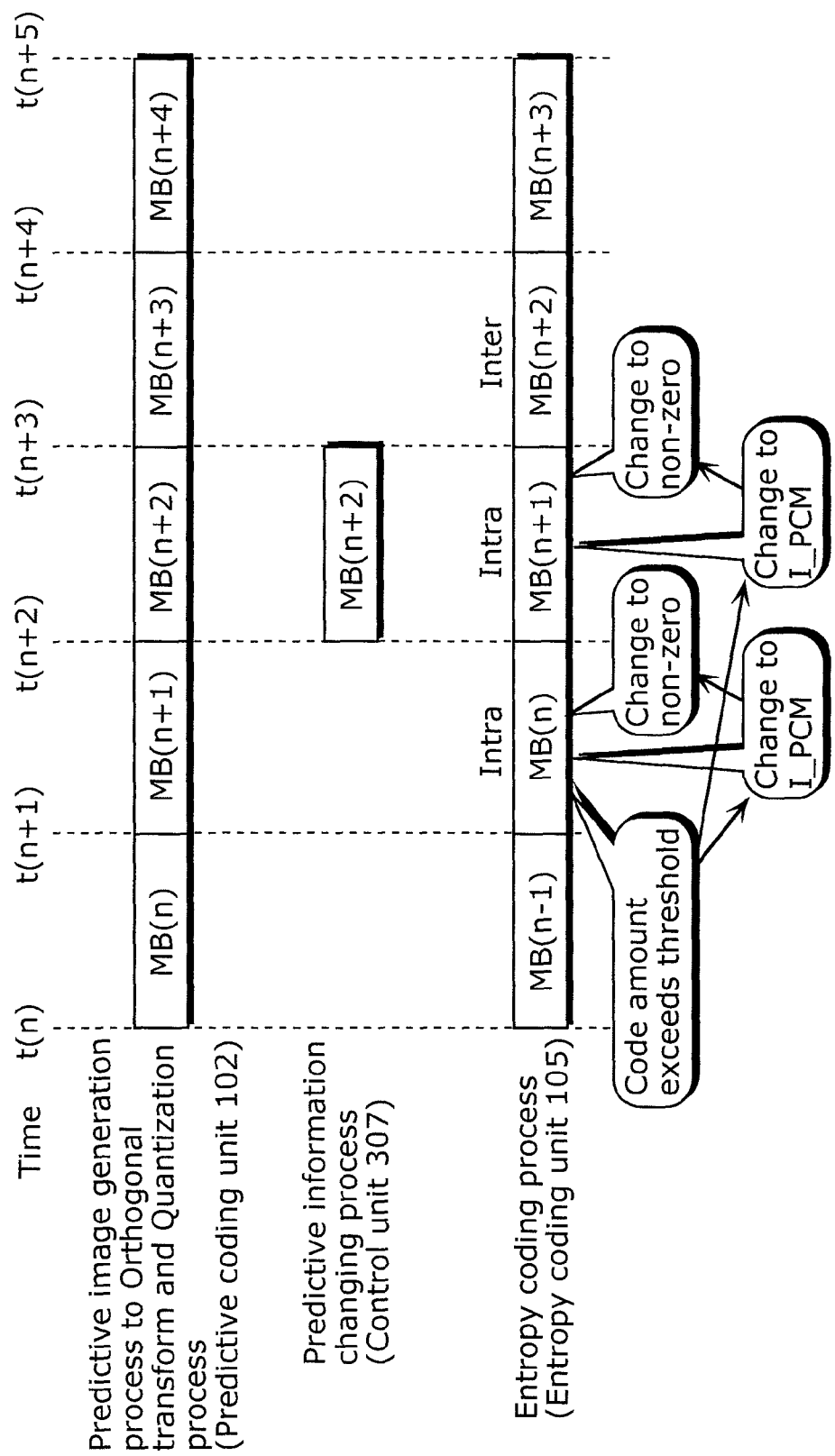
FIG. 12 is a diagram showing an example of a case of performing the coding process in the third embodiment using a pipeline structure.

Hereinafter, the case where the MB type of MB(n) is to be changed to I_PCM at a time t(n+2) while processing is performed using a pipeline structure as shown in FIG. 12. Specifically, the case where the code amount of the coded data corresponding to MB(n) exceeds 3200 bits when the entropy coding unit 105 codes MB(n) shall be described.

It should be noted that, here, when the MB type is intra, it is assumed that the prediction mode is the prediction mode 1 shown in FIG. 5, and the predictive block is generated using the pixel values of the adjacent pixels to the left of the MB (that is, the pixels at the right-end of a left-adjacent MB).

As shown in FIG. 12, when the code amount generated in the coding of MB(n) by the entropy coding unit 105 exceeds 3200 bits, the control unit 307 changes the MB type of MB(n) and the MB type of MB(n+1) to I_PCM. Here, as described in the first embodiment, the MB type of MB(n+1) is also changed in order secure the time required for generating the predictive information for MB(n+2).

Here, it is assumed that the MB type of MB(n) and MB(n+1) is intra, and the MB type of MB(n+2) is inter-series. Furthermore, it is assumed that the pixel values at the right-end of the locally decoded blocks corresponding to each of MB(n) and MB(n+1) are 0.

Since non-zero changing is performed on the pixel value of the locally decoded block corresponding to MB(n+1) when the MB type of MB(n+1) is changed to I_PCM, the predictive image changes when the MB type of MB(n+2) is intra. However, as shown in the example in FIG. 12, since the MB type of MB(n+2) is inter-series, it is sufficient to change only the predictive information. For example, when the MB type of MB(n+1) is changed to I_PCM, the predictive vector of MB(n+2) is re-calculated by setting the motion vector of the left-adjacent MB to 0 and the reference index to −1. At this time, the MB type of MB(n+2) is re-set to any one of the inter-series based on the conditions in the H.264 standard, based on the re-calculated predictive vector and differential image.

Furthermore, since an inter-series MB does not require changing of pixel values, there is no need to redo the processes after intra prediction when the left-adjacent MB of an intra MB is an inter-series MB, and changing to I_PCM is also unnecessary. Specifically, it is also possible to change to I_PCM only MBs up to the appearance of an inter-series MB, among the MBs following an MB that is changed to I_PCM. In the example shown in FIG. 12, since the MB type of MB(n+2) is inter-series, both the MB type and the predictive information of MB(n+3) do not need to be changed.

Specifically, when the code amount of MB(n) is judged by the judging unit 106 to be larger than the threshold, the control unit 307 changes the MB type of MB(n) to I_PCM and next changes, to I_PCM, the MB type of blocks up to the appearance of a block whose MB type is any one of skip, direct, or inter. In the example shown in FIG. 12, since the MB type of MB(n+2) is intra, the control unit 307 changes the MB type of MB(n+1) and MB(n+2) to I_PCM.

As described above, the image coding apparatus 300 in the present embodiment changes the MB type to I_PCM and judges the MB type of an MB that refers to the locally decoded block corresponding to an MB having a pixel value that has been changed to a non-zero value, and changes the MB type to I_PCM only when the MB type is intra. When the MB type is inter-series, the predictive information is re-calculated, and the coding type is re-set to inter-series.

With this, even when the locally decoded image changes following the changing of a pixel value, the MBs to be changed to I_PCM can be kept to a minimum by judging the MB type. Since the code amount of an I_PCM MB is often larger than the code amount of an intra or inter macroblock, the code amount can be reduced by reducing the number of MBs to be changed to I_PCM.

Fourth Embodiment

When a code amount of coded data generated by coding a first block exceeds a threshold, an image coding apparatus in a fourth embodiment is characterized by outputting an input image as an uncompressed image corresponding to such coded data, and replacing the locally decoded image of the first block with the uncompressed image, that is, the input image.

Figure 13:
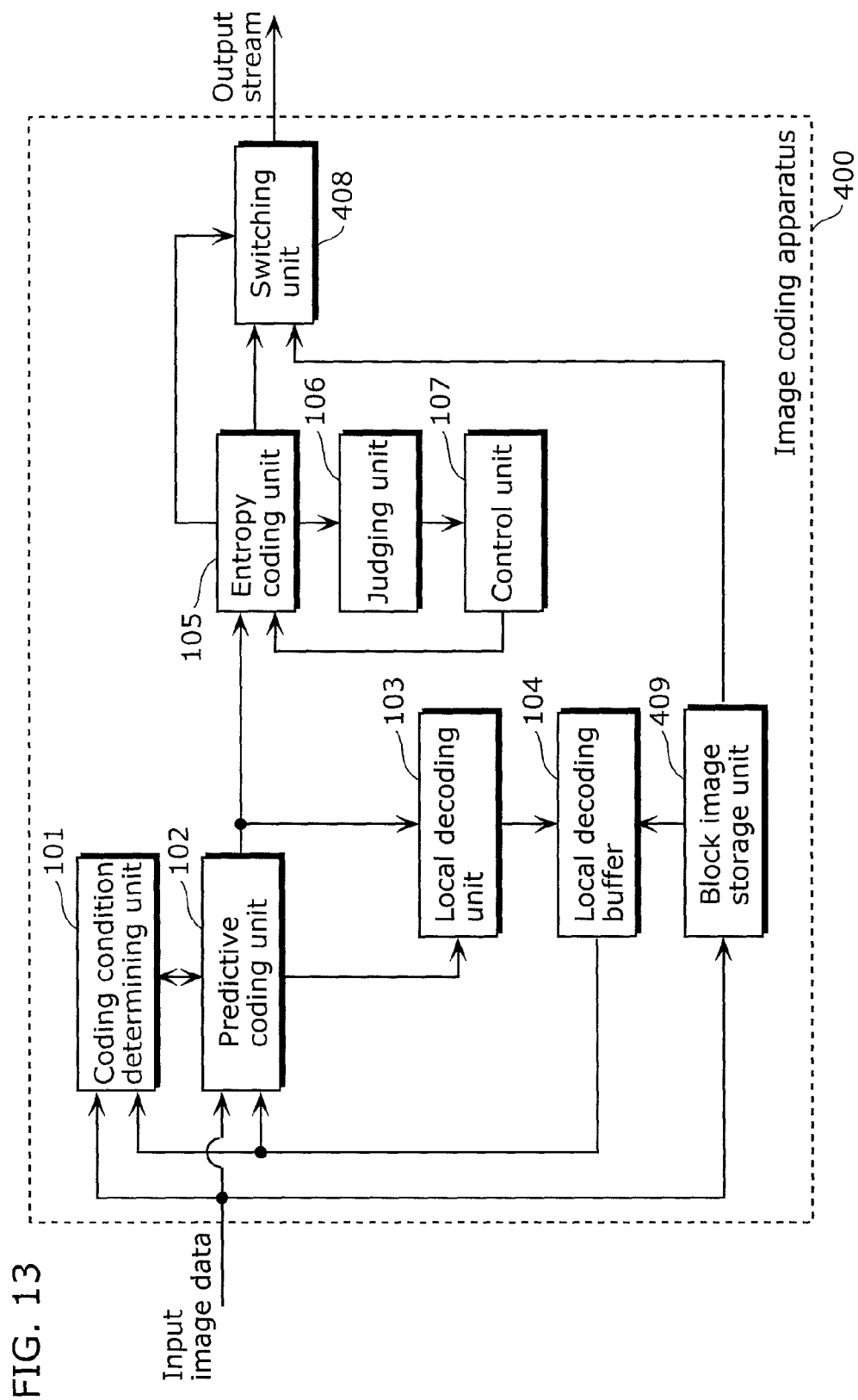
FIG. 13 is a block diagram showing the configuration of an image coding apparatus in a fourth embodiment.

FIG. 13 is a block diagram showing the configuration of an image coding apparatus 400 in the fourth embodiment. The image coding apparatus 400 shown in the diagram is different compared to the image coding apparatus 100 in FIG. 1 in newly including a block image storage unit 409 and in including a switching unit 408 in place of the switching unit 108. Hereinafter, description of points which are the same as in the first embodiment shall be omitted and description shall be focused on the points of difference.

It should be noted that, as a premise, the image coding apparatus 400 in the present embodiment codes input image data on a per MB basis based on the H.264 standard. Furthermore, as a premise, the coding process on a per MB basis is executed based on hardware having a pipeline structure.

The block image storage unit 409 is an example of the image storage unit for storing input images, and includes a memory, and the like, for storing, as a block image, input image data corresponding to the current MB to be coded. The block image storage unit 409 replaces the locally decoded image stored in the local decoding buffer 104 with the block image corresponding to an MB whose MB type has been changed to I_PCM. This is because, since a block image has been outputted as an output stream, it is necessary to generate a predictive image using a block image when coding a subsequent block in order to decode the output stream accurately at the decoder-side.

The switching unit 408 selects and outputs one of the coded data generated by the entropy coding unit 105 and the block image data stored in the block image storage unit 409. Specifically, the difference from the first embodiment is in the use of a block image, that is, the input image data, and not a locally decoded image, as the coded data corresponding to the MB whose MB type has been changed to I_PCM. Specifically, when the MB type of the current MB to be coded which is received from the entropy coding unit 105 is I_PCM, the switching unit 408 outputs a block image corresponding to the current MB to be coded, from the block image storage unit 409, as the output stream. Furthermore, when the MB type is other than I_PCM, the switching unit 408 outputs the coded data generated by the entropy coding unit 105 as the output stream.

Next, the operation of the image coding apparatus 400 in the present embodiment shall be described. In the present embodiment, since the input image is coded on a per MB basis, the sequence of processes executed on one MB shall be described.

Figure 14:
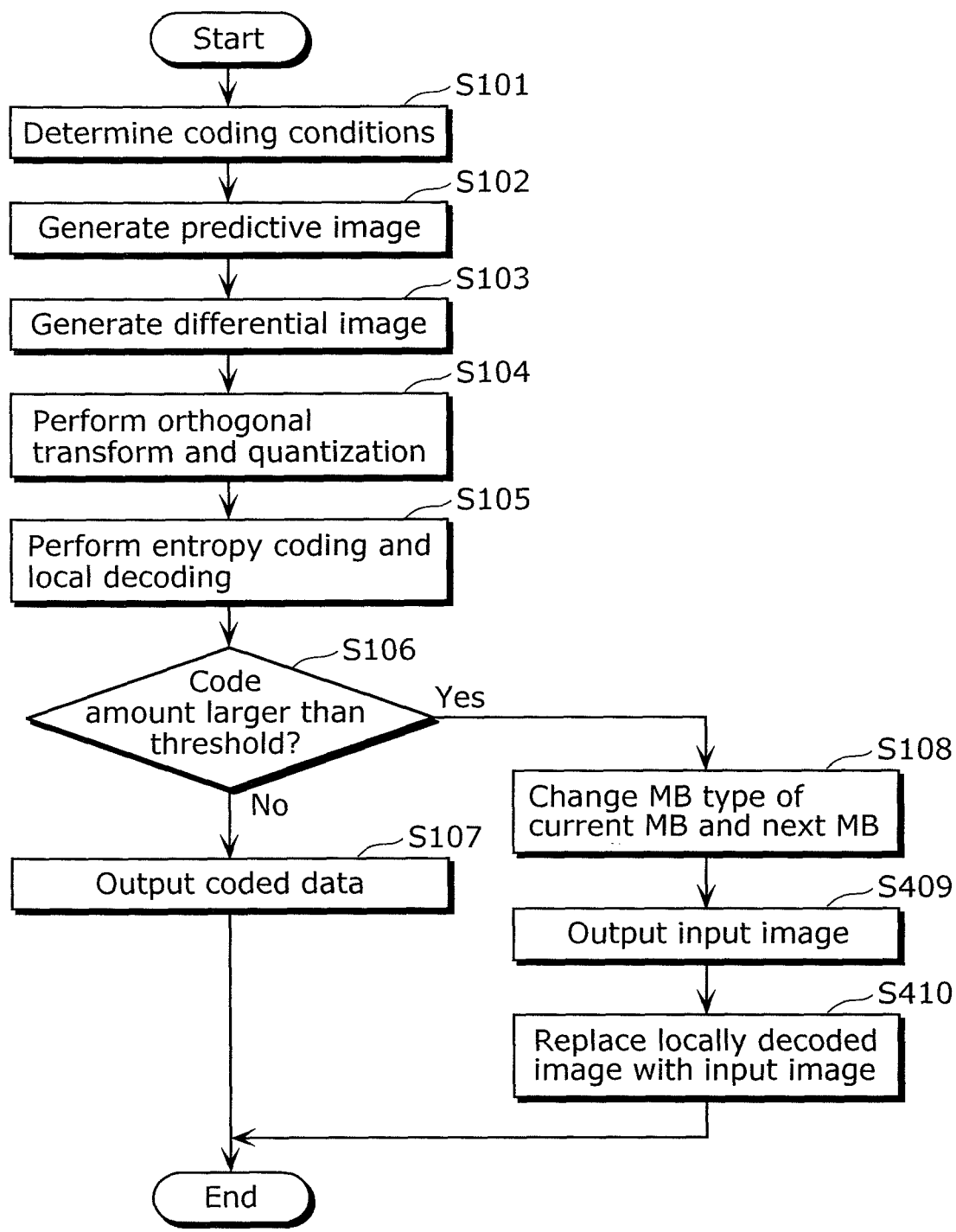
FIG. 14 is a flowchart showing the operation of the image coding apparatus in the fourth embodiment.

FIG. 14 is a flowchart showing the operation of the image coding apparatus 400 in the fourth embodiment. Processes that are the same as those in FIG. 3 are given the same numerical references and their description here shall be omitted.

In the same manner as with the image coding apparatus 100 in the first embodiment, the image coding apparatus 400 performs, on the current MB to be coded, the processes from the coding condition determining process (S101) up to the code amount judgment process (S106).

When the code amount of the coded data is equal to or less than 3200 bits (No in S106), the switching unit 408 outputs the coded data as the output stream (S107).

When the code amount of the coded data exceeds 3200 bits (Yes in S106), the control unit 107 changes, to I_PCM, the MB type of the MB corresponding to the coded data (current MB to be coded) and the MB type of the next MB (S108).

Subsequently, the switching unit 408 reads an input image (block image) corresponding to the current MB to be coded, from the block image storage unit 409, and outputs the read block image as the output stream (S409). Furthermore, the block image storage unit 409 replaces, with the read block image, the locally decoded image (locally decoded block) stored in the local decoding buffer 104 and corresponding to the current MB to be coded (S410).

Focusing on one MB, the image coding apparatus 400 in the present embodiment codes an input image on a per MB basis in the above manner. The image coding apparatus 400 in the present embodiment implements all the processes using a pipeline structure and plural MBs are processed simultaneously.

Hereinafter, the case where the MB type of MB(n) is to be changed to I_PCM at a time t(n+4) while processing is performed using the pipeline structure as shown in FIG. 4. Specifically, the case where the entropy coding unit 105 codes MB(n) and the code amount of the coded data corresponding to MB(n) exceeds 3200 bits shall be described.

By changing the MB type of MB(n) to I_PCM, it is necessary to change the predictive information of MB(n+1) which is the right-adjacent MB. Since the process of changing the predictive information must be executed by the time the entropy coding process of MB(n+1) is started, the pipeline structure cannot be maintained when the changing of the predictive information of MB(n+1) is attempted.

Consequently, by likewise changing the MB type of MB(n+1) to I_PCM as shown in FIG. 6, the control unit generates the predictive information of MB(n+2) by making use of the period in which the entropy coding process is being performed on MB(n+1). With this, it is possible to cover-up the impact of the amount of processing in the changing of predictive information.

It should be noted that, at this time, the control unit 107 changes the MB type of MB(n) to I_PCM, and the block image storage unit 409 replaces, with the pixel value of the block image corresponding to MB(n), the pixel value of the locally decoded image stored in the local decoding buffer 104 and corresponding to MB(n).

As described above, when the code amount of the coded data of the first MB exceeds the threshold, the image coding apparatus 400 in the present embodiment changes the MB type of the first MB to I_PCM and, in addition, also changes the MB type of at least one second MB which is successive to the first MB to I_PCM. At this time, the input image (block image) corresponding to the MB that has been changed to I_PCM is outputted as an output stream.

With this, the predictive information of a third MB which is successive to the second MB can be generated in the period in which the entropy coding of the second MB is being performed, and thus the pipeline structure can be maintained.

Furthermore, since the input image is outputted as the output stream, a decoded image which is more similar to the input image can be reconstructed at the decoder-side.

Fifth Embodiment

When a code amount of coded data generated by coding a first block exceeds a threshold, an image coding apparatus in a fifth embodiment changes the coding type of the first block into a specified coding type, and outputs an input image as an uncompressed image corresponding to such coded data and replaces the locally decoded image of the first block with the uncompressed image. In addition, at this time, the image coding apparatus in the fifth embodiment is characterized by changing, to a non-zero value, the pixel values of the locally decoded image of a block that has been changed to the specified coding type.

Figure 15:
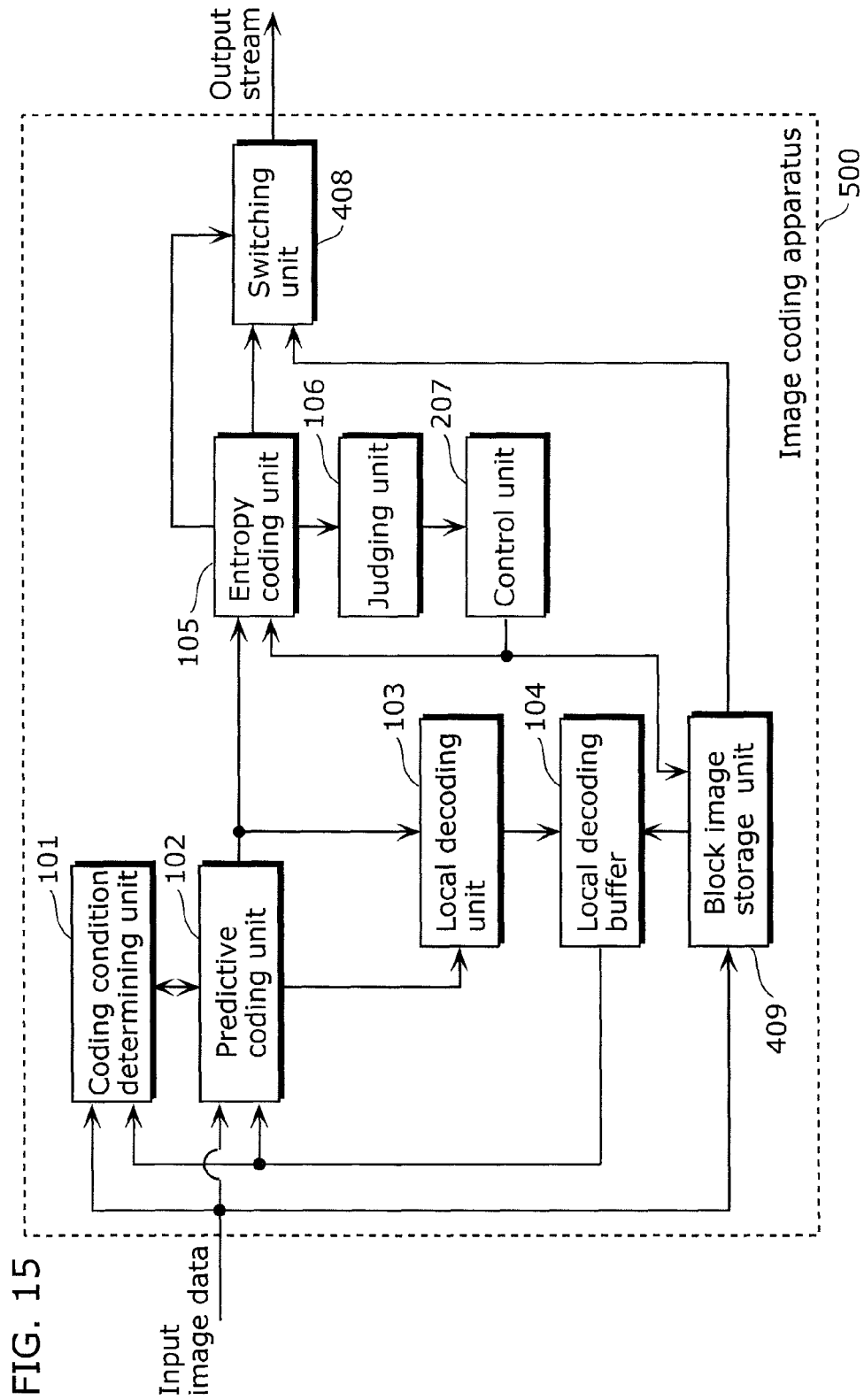
FIG. 15 is a block diagram showing the configuration of an image coding apparatus in a fifth embodiment.

FIG. 15 is a block diagram showing the configuration of an image coding apparatus 500 in the fifth embodiment. The image coding apparatus 500 shown in the diagram is different compared to the image coding apparatus 400 in FIG. 13 in including the control unit 207 in place of the control unit 107. Furthermore, the image coding apparatus 500 shown in the diagram is different compared to the image coding apparatus 200 in FIG. 7 in newly including the block image storage unit 409 and in further including the switching unit 408 in place of the switching unit 108. Hereinafter, description of points which are the same as in the second and fourth embodiments shall be omitted and description shall be focused on the points of difference.

It should be noted that, as a premise, the image coding apparatus 500 in the present embodiment codes an input image based on the Baseline Profile or Main Profile in the H.264 standard. Furthermore, as a premise, the coding process on a per MB basis is executed based on hardware having a pipeline structure.

As described in the second embodiment, the control unit 207 changes, to I_PCM, the MB type of the current MB to be coded and the MB type of an MB for which coding is not finished. In addition, the control unit 207 changes, to a non-zero value (for example, 1), a pixel having a pixel value of 0 out of pixels of a block image stored in the block image storage unit 409, which corresponds to the MB that has been changed to an I_PCM macroblock.

The block image storage unit 409 includes a memory, and the like, for storing, as a block image, input image data corresponding to the current MB to be coded. In addition, the block image storage unit 409 replaces the locally decoded image stored in the local decoding buffer 104 with the block image, that is, the input image, corresponding to the MB whose MB type has been changed to I_PCM. At this time, when a pixel value needs to be changed by the control unit 207 to a non-zero value, the block image storage unit 409 replaces the locally decoded image with the block image after the changing of the pixel value to a non-zero value.

Next, the operation of the image coding apparatus 500 in the present embodiment shall be described. In the present embodiment, since the input image is coded on a per MB basis, the sequence of processes executed on one MB shall be described.

Figure 16:
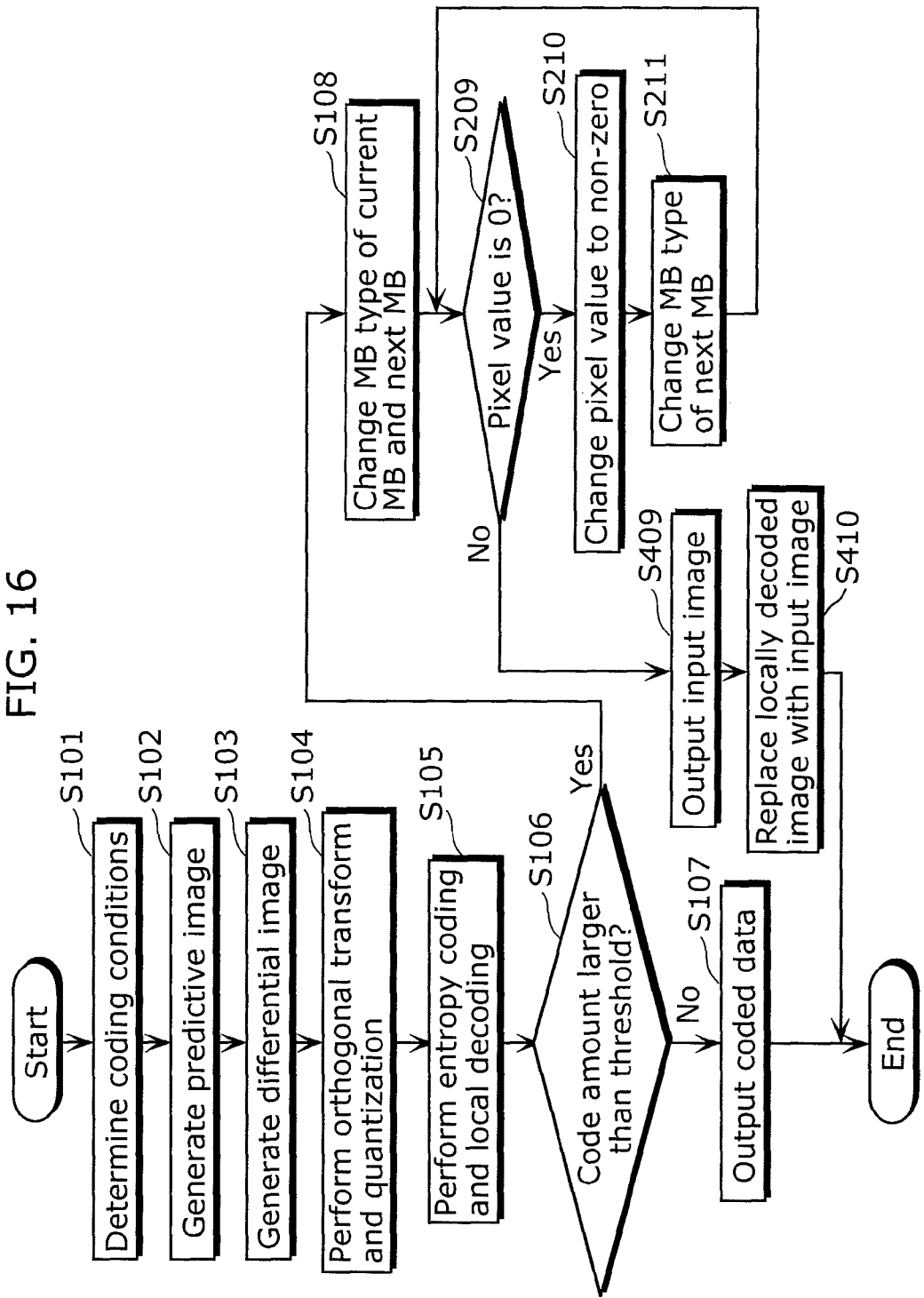
FIG. 16 is a flowchart showing the operation of the image coding apparatus in the fifth embodiment.

FIG. 16 is a flowchart showing the operation of the image coding apparatus 500 in the fifth embodiment. Processes that are the same as those in FIG. 8 are given the same numerical references and their description here shall be omitted.

In the same manner as with the image coding apparatuses 100 and 400 in the first and fourth embodiments, respectively, the image coding apparatus 500 performs, on the current MB to be coded, the processes from the coding condition determining process (S101) up to the code amount judgment process (S106).

When the code amount of the coded data is equal to or less than 3200 bits (No in S106), the switching unit 408 outputs the coded data as the output stream (S107).

When the code amount of the coded data exceeds 3200 bits (Yes in S106), the control unit 207 changes, to I_PCM, the MB type of the MB corresponding to the coded data (current MB to be coded) and the MB type of the next MB (S108). In addition, the control unit 207 judges whether or not a pixel having a pixel value of 0 is present among the pixels of the input image (block image) stored in the block image storage unit 409 and corresponding to the MB whose MB type has been changed to I_PCM (S209).

When a pixel having a pixel value of 0 is present (Yes in S209), the control unit 207 changes the pixel value of such pixel to a non-zero value (for example, 1) (S210).

Since the locally decoded image is replaced with the block image, the predictive image for the next MB changes following the changing of the pixel value of the block image. As such, the control unit 207, in addition, changes the MB type of the next MB to I_PCM (S211). It should be noted that the next MB described here is an MB that is coded next after the MB corresponding to the block image having the changed pixel value, and is an MB that is coded using, as a predictive image, the locally decoded block that is replaced with the block image having the changed pixel value. Subsequently, the control unit 207 repeats the MB type changing process (S209 to S211) until a block image whose pixels are all non-zero values appears.

When the pixel values are all non-zero values (No in S209), the switching unit 408 reads the input image (block image) corresponding to the current MB to be coded, from the block image storage unit 409, and outputs the read block image as the output stream (S409). Furthermore, the block image storage unit 409 replaces, with the read block image, the locally decoded image (locally decoded block) stored in the local decoding buffer 104 and which corresponds to the current MB to be coded (S410).

Focusing on one MB, the image coding apparatus 500 in the present embodiment codes an input image on a per MB basis in the above manner. The image coding apparatus 500 in the present embodiment implements all the processes using a pipeline structure and plural MBs are processed simultaneously.

Hereinafter, the case where the MB type of MB(n) is to be changed to I_PCM at a time t(n+2) while processing is performed using a pipeline structure as shown in FIG. 9. Specifically, the case where the code amount of the coded data corresponding to MB(n) exceeds 3200 bits when the entropy coding unit 105 codes MB(n) shall be described.

It should be noted that, here, it is assumed that the MB type of all the MBs is intra. Furthermore, it is assumed that the prediction mode at this time is the prediction mode 1 shown in FIG. 5, and the predictive block is generated using the pixel values of the pixels adjacent to the left of each MB (that is, the pixels on the right-end of a left-adjacent MB).

When, out of pixel values of MB(n), the pixel value of any of the pixels located on the right-end of the MB is 0, the control unit 207 changes such pixel value of the block image (input image), from 0 to 1. Subsequently, the block image storage unit 409 replaces the locally decoded image stored in the local decoding buffer 104 with the block image having the changed pixel value.

With this, since the prediction mode for intra prediction is the first prediction mode and the locally decoded image that is replaced with the block image is used in the generation of a predictive block of MB(n+1) here, the predictive image changes. As such, the control unit 207 also changes the MB type of MB(n+1) to I_PCM.

In addition, when the same conditions also apply to the MBs after MB(n+1), it is necessary to change, to I_PCM, the MB type of an MB for which the prediction image generating process has already ended at the time t(n+2) (only MB(n+1) in the example in FIG. 9). At this time, in view of the processing time for changing pixel values from 0 to 1, it is also possible to change, to I_PCM, the MB type of MBs up to MB(n+2).

As shown in FIG. 9, when the code amount generated in the coding of MB(n) by the entropy coding unit 105 exceeds 3200 bits, the coding unit 207 changes the MB type of MB(n) and the MB type of MB(n+1) to I_PCM. Here, as described in the first embodiment, the MB type of MB(n+1) is also changed in order secure the time required for generating the predictive information for MB(n+2).

Here, when any of the right-end pixel values of the block images corresponding respectively to MB(n) and MB(n+1) is 0, the control unit 207 changes such pixel to a non-zero as shown in FIG. 9. After the pixel value has been changed to a non-zero value, the block image storage unit 409 replaces the locally decoded block stored in the local decoding buffer 104 with the block image corresponding to the MB that has been changed to I_PCM. Therefore, since the predictive image of MB(n+2) changes when the pixel value of the block image of MB(n+1) is changed and the locally decoded block of MB(n+1) is replaced, the MB type of MB(n+2) also needs to be changed to I_PCM.

When the pixel values at the right-end of the input image corresponding to MB(n+2) are all non-zero values, the predictive image does not change, and thus the MB type of MB (n+3) may be retained as intra. Furthermore, in the same manner, when MB(n+2) is an MB having a prediction mode (for example, prediction mode 0) that does not use left-adjacent pixels, the predictive image does not change, and thus the MB type of MB (n+3) may be retained as intra.

As described above, in the case where, in the changing of an MB type to I_PCM, a pixel having a pixel value of 0 is included in the input image corresponding to the MB whose MB type has been changed, the image coding apparatus 500 in the present embodiment changes the pixel value of such pixel to a non-zero value. Subsequently, the input image (block image) on which the non-zero value changing has been performed is outputted as an output stream.

Furthermore, the locally decoded image is replaced with the input image on which non-zero value changing has been performed. At this time, in generating the predictive image, the MB type of an MB that refers to the locally decoded image that is been replaced with the input image is changed to I_PCM.

With this, even when the predictive image changes following the changing of a pixel value, it is possible to generate an output stream that can be decoded accurately at the decoder-side.

Sixth Embodiment

When a code amount of coded data generated by coding a first block exceeds a threshold, an image coding apparatus in a sixth embodiment changes, to a specified coding type, the coding type of the first block and the coding type of a second block which has a coding type of intra out of at least one block for which coding is not yet completed. At this time, the image coding apparatus in the sixth embodiment is characterized by outputting an input image as an uncompressed image in place of the coded data of the block that has been changed to the specified coding type, and replacing the locally decoded image with the uncompressed image. Furthermore, for a block whose coding type is inter, skip, or direct, out of at least one block for which coding is not yet completed, the image coding apparatus in the sixth embodiment generates the predictive information of such block and changes the coding type of such block to inter, skip, or direct.

Figure 17:
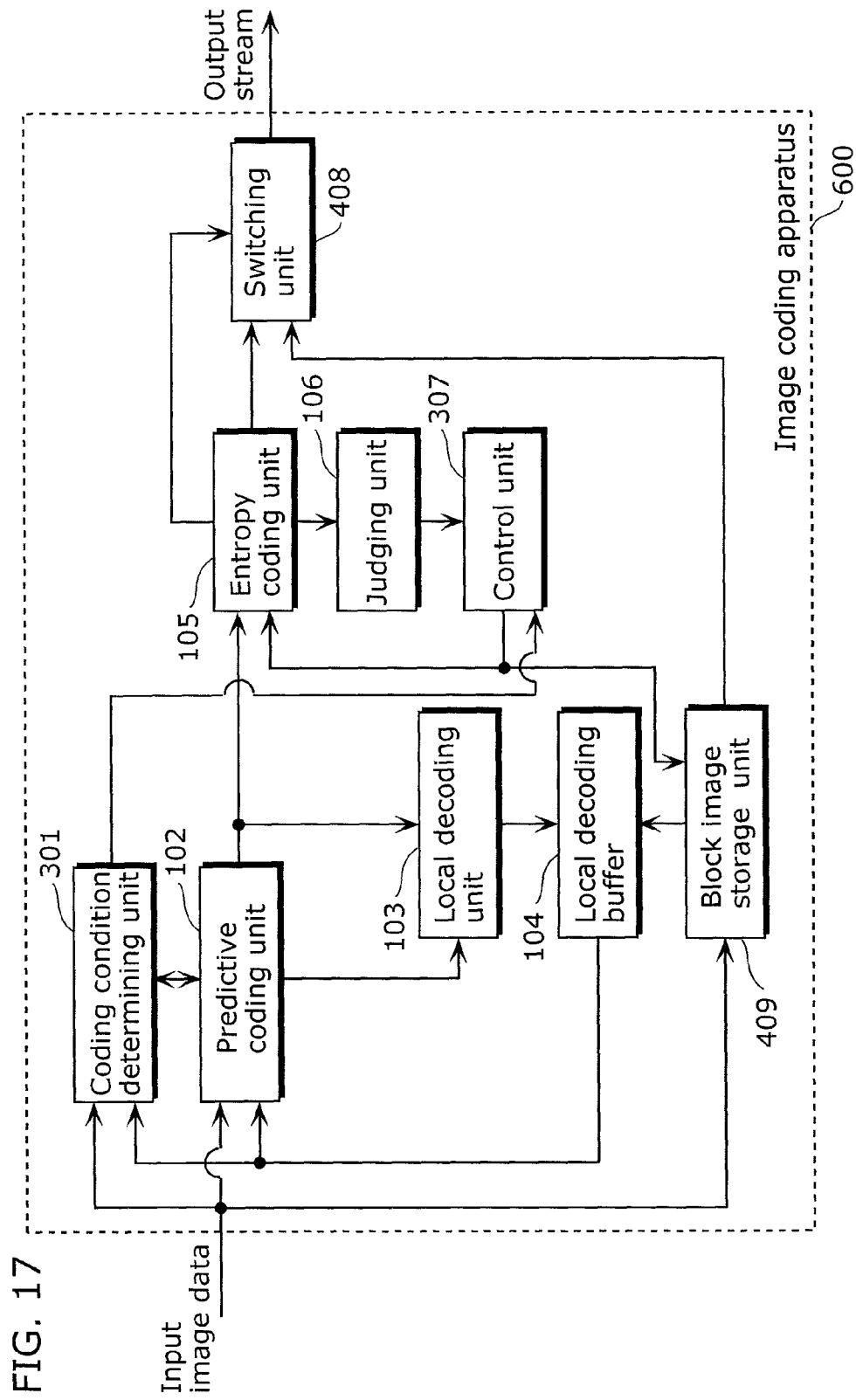
FIG. 17 is a block diagram showing the configuration of an image coding apparatus in a sixth embodiment.

FIG. 17 is a block diagram showing the configuration of an image coding apparatus 600 in the sixth embodiment. The image coding apparatus 600 shown in the diagram is different compared to the image coding apparatus 500 in FIG. 15 in including the control unit 307 in place of the control unit 207, and including the coding condition determining unit 301 in place of the coding condition determining unit 101. Furthermore, the image coding apparatus 600 shown in the diagram is different compared to the image coding apparatus 300 in FIG. 10 in newly including the block image storage unit 409 and in further including the switching unit 408 in place of the switching unit 108. Hereinafter, description of points which are the same as in the third and fifth embodiments shall be omitted and description shall be focused on the points of difference.

It should be noted that, as a premise, the image coding apparatus 600 in the present embodiment codes an input image based on the Baseline Profile or Main Profile in the H.264 standard. Furthermore, as a premise, the coding process on a per MB basis is executed based on hardware having a pipeline structure.

In the same manner as in the third embodiment, the control unit 307 changes, to I_PCM, the MB type of the current MB to be coded and the MB type of an MB for which coding has not yet finished, based on the judgment result of the judgment unit 106. However, at this time, the control unit 307 determines whether or not to change an MB type to I_PCM, based on the MB type determined by the coding condition determining unit 301. In addition, the control unit 307 changes, to a non-zero value (for example, 1), a pixel which is of a block image stored in the block image storage unit 409 and corresponding to the MB that has been changed to I_PCM, and whose pixel value is 0.

Next, the operation of the image coding apparatus 600 in the present embodiment shall be described. In the present embodiment, since the input image is coded on a per MB basis, the sequence of processes executed on one MB shall be described.

Figure 18:
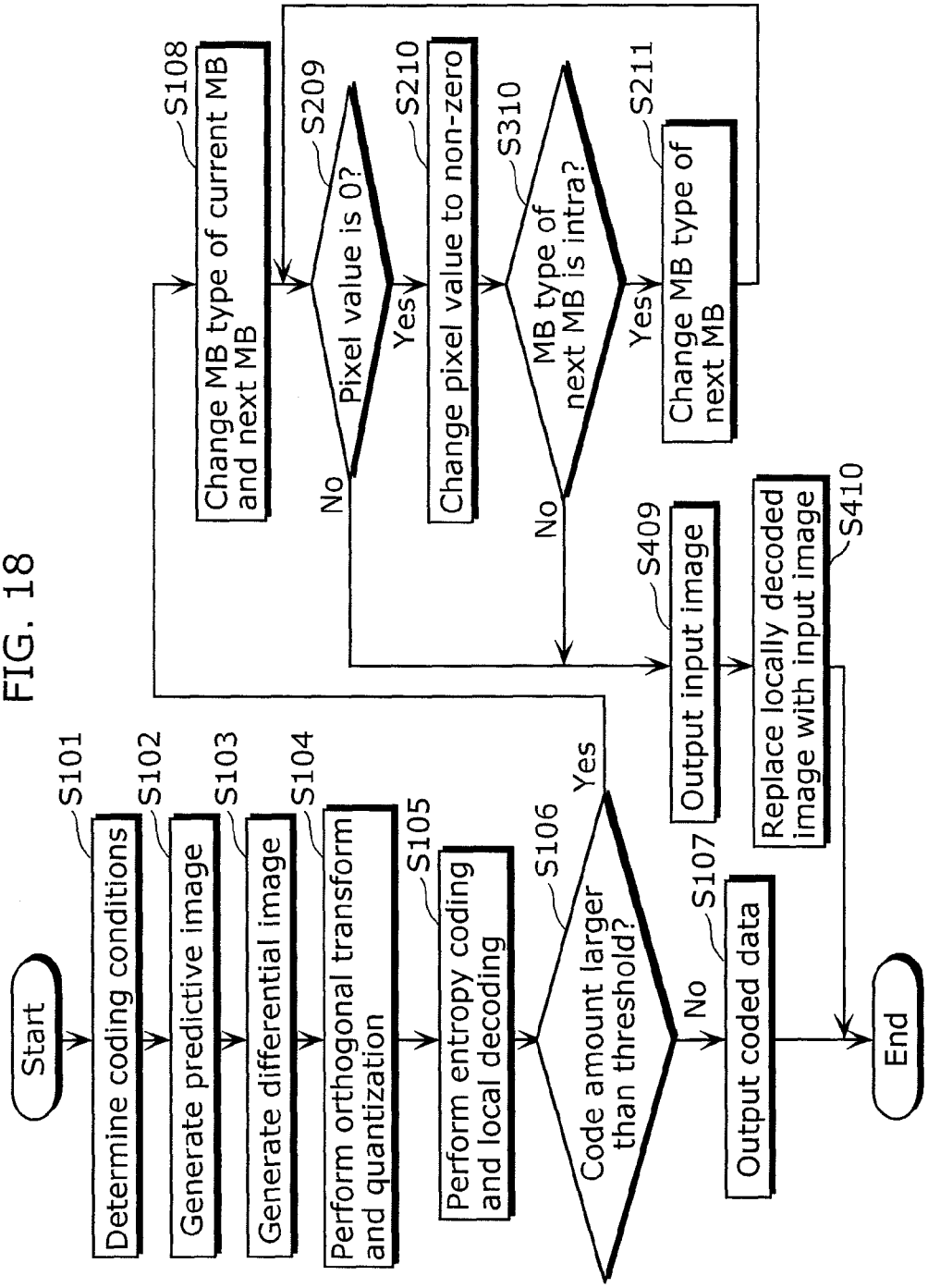
FIG. 18 is a flowchart showing the operation of the image coding apparatus in the sixth embodiment.

FIG. 18 is a flowchart showing the operation of the image coding apparatus 600 in the sixth embodiment. Processes that are the same as those in FIG. 16 are given the same numerical references and their description here shall be omitted.

In the same manner as in the fifth embodiment, the control unit 307 judges whether or not a pixel having a pixel value of 0 is present among the pixels of the input image (block image) stored in the block image storage unit 409 and corresponding to the MB whose MB type has been changed to I_PCM (S209).

When a pixel having a pixel value of 0 is present (Yes in S209), the control unit 307 changes such pixel to a non-zero value (for example, 1) (S210). Here, the control unit 307 judges whether the MB type of the next MB is intra or inter (S310). It should be noted that the next MB described here is an MB that is coded next after the MB corresponding to the block image having the changed pixel value, and is an MB that is coded using, as a predictive image, the locally decoded block that is replaced with the block image having the changed pixel value.

When the MB type of the next MB is intra (Yes in S310), the predictive image of the next MB changes following the changing of the pixel value of the block image due to the replacement of the locally decoded image with the block image, and thus the control unit 307, in addition, changes the MB type of the next MB to I_PCM (S211). Subsequently, the control unit 307 repeats the MB type changing process (S209 to S211) until a block image whose pixels all have non-zero values appears.

When the MB type of the next MB is inter (No in S310) and when the pixel values are all non-zero values (No in S209), the switching unit 408 reads the input image (block image) corresponding to the current MB to be coded from the block image storage unit 409, and outputs the read block image as an output stream (S409).

Furthermore, the block image storage unit 409 replaces, with the read block image, the locally decoded image (locally decoded block) stored in the local decoding buffer 104 and corresponding to the current MB to be coded (S410).

Focusing on one MB, the image coding apparatus 600 in the present embodiment codes an input image on a per MB basis in the above manner. The image coding apparatus 600 in the present embodiment implements all the processes using a pipeline structure and plural MBs are processed simultaneously.

Hereinafter, the case where the MB type of MB(n) is to be changed to I_PCM at a time t(n+2) while processing is performed using a pipeline structure as shown in FIG. 12. Specifically, the case where the entropy coding unit 105 codes MB(n) and the code amount of the coded data corresponding to MB(n) exceeds 3200 bits shall be described.

It should be noted that, here, when the MB type is intra, it is assumed that the prediction mode is the prediction mode 1 shown in FIG. 5, and the predictive block is generated using the pixel values of the pixels adjacent to the left of the MB (that is, the pixels at the right-end of a left-adjacent MB).

As shown in FIG. 12, when the code amount generated in the coding of MB(n) by the entropy coding unit 105 exceeds 3200 bits, the control unit 307 changes the MB type of MB(n) and the MB type of MB(n+1) to I_PCM. Here, as described in the first embodiment, the MB type of MB(n+1) is also changed in order secure the time required for generating the predictive information for MB(n+2).

Here, it is assumed that the MB type of MB(n) and MB(n+1) is intra, and the MB type of MB(n+2) is inter-series. Furthermore, it is assumed that a right-end pixel value of the input image (block image) corresponding to each of MB(n) and MB(n+1) is 0. Subsequently, the block image storage unit 409 replaces the locally decoded image stored in the local decoding buffer 104 with the block image having the changed pixel value.

Since non-zero changing is performed on the pixel values of the block image corresponding to MB(n+1) when the MB type of MB(n+1) is changed to I_PCM, the predictive image changes when the MB type of MB(n+2) is intra. However, as shown in the example in FIG. 12, since the MB type of MB(n+2) is inter-series, it is sufficient to change only the predictive information.

For example, when the MB type of MB(n+1) is changed to I_PCM, the predictive vector of MB(n+2) is re-calculated by setting the motion vector of the left-adjacent MB to 0 and the reference index to −1. At this time, the MB type of MB(n+2) is re-set to any one of the inter-series based on the conditions in the H.264 standard, based on the re-calculated predictive vector and differential image.

Furthermore, since an MB of the inter-series does not require changing of pixel values, there is no need to redo the processes after intra prediction when the left-adjacent MB of an intra MB is an inter-series MB, and changing to I_PCM is also unnecessary. Specifically, it is also possible to change to I_PCM only MBs up to the appearance of an inter-series MB, among the MBs subsequent to an MB that is changed to I_PCM. In the example shown in FIG. 12, since the MB type of MB(n+2) is inter-series, the MB type of MB(n+3) does not need to be changed.

As described above, the image coding apparatus 600 in the present embodiment changes the MB type to I_PCM and replaces the locally decoded block with the block image having pixel values changed to a non-zero value. Subsequently, the image coding apparatus 600 also changes, to I_PCM, the MB type of an MB that refers to the locally decoded block that has been replaced.

With this, even when the predictive image changes following the changing of a pixel value, it is possible to generate an output stream that can be decoded accurately at the decoder-side.

Although the image coding apparatus and the image coding method in the present invention have been described thus far based on the embodiments, the present embodiment is not limited to these embodiments. Various modifications to the present embodiments and forms configured by combining constituent elements in different embodiments that can be conceived by those skilled in the art without departing from the teachings of the present invention are included in the scope of the present invention.

For example, the judging unit 106 may estimate the code amount of the coded data to be generated by the entropy coding unit 105, based on the transformed data generated by the predictive coding unit 102, and judge whether or not the estimated estimate code amount is larger than the threshold. For example, part of the transformed data is coded by the entropy coding unit 105, and the judging unit 106 estimates, based on the generated code amount, the code amount that will be generated when all of the transformed data is coded. For example, the estimate code amount is assumed to be n-times the code amount generated when 1/nth the amount of the transformed data is coded.

Alternatively, the judging unit may record a table in which the code amounts generated during past entropy coding and the sizes of the transformed data, and so on, are associated with each other, and estimate the estimate code amount by referring to the table.

Figure 19:
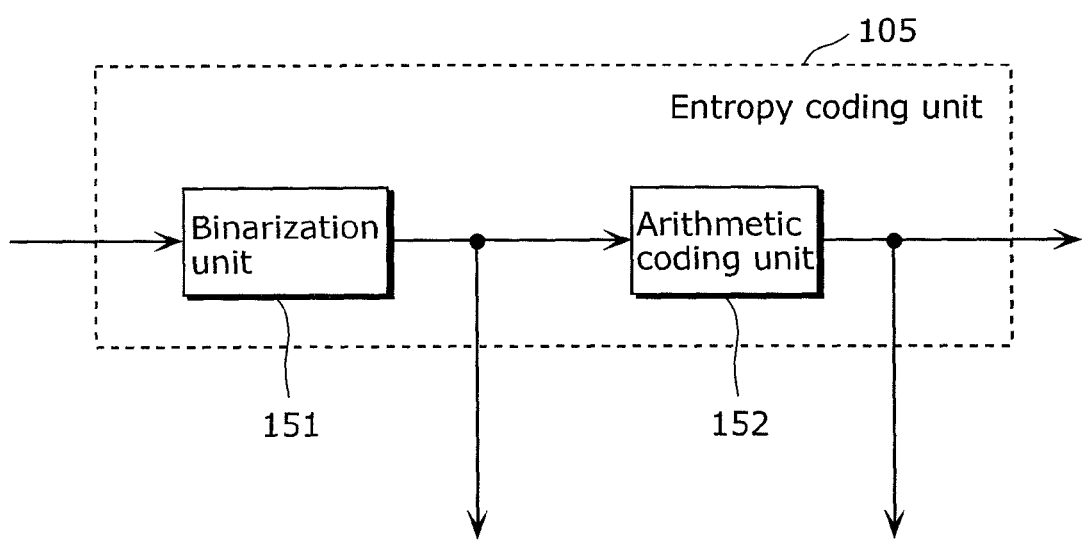
FIG. 19 is a block diagram showing the detailed configuration of an entropy coding unit.

Furthermore, the entropy coding unit 105 may code the transformed data using the Context-Adaptive Binary Arithmetic Coding (CABAC) method. At this time, the entropy coding unit 105 includes a binarization unit 151 and an arithmetic coding unit 152, as shown in FIG. 19.

The binarization unit 151 converts the transformed data generated by the predictive coding unit 102 into binary data.

The arithmetic coding unit 152 performs arithmetic coding on the binary data resulting from the conversion by the binarization unit 151.

It should be noted that, at this time, the judging unit 106 may estimate the code amount of the coded data based on the binary data generated by the binarization unit 151. For example, the judging unit 106 may record a table in which the code amounts generated during past arithmetic coding and the sizes of the binary data, and so on, are associated with each other, and estimate the estimate code amount by referring to the table.

Furthermore, as shown in FIG. 20, when the block MB(n) for which the code amount of coded data is judged to be larger than the threshold is located at the right-end of the image, the coding type of MB(n+1) which is the next block in the coding order need not be changed to I_PCM. This is because MB(n+1) is not used in the prediction of MB(n). In this manner, when MB(n), which is the block for which the code amount is judged to be larger than the threshold, and MB(n+1), which is the next block in the coding order, are not spatially adjacent to each other, it is acceptable to change, to I_PCM, only the coding type of MB(n) out of MB(n) and MB(n+1).

Furthermore, although I_PCM is described in each of the embodiments as an example of the specified coding type, types other than I_PCM are also acceptable as long as the image coding apparatus in the present embodiment outputs an uncompressed image for a block for which the specified coding type has been set.

Furthermore, although the respective processes performed by the image coding apparatus in the present invention are implemented using a pipeline structure, they may be pipelined in any manner or may be implemented without using a pipeline structure. Furthermore, the respective processes performed by the image coding apparatus in the present invention may be performed in parallel using software instead of using a hardware structure.

It should be noted that, as described above, the present invention may be implemented, not only as an image coding apparatus and an image coding method, but also as a program which causes a computer to execute the image coding method in the embodiments. Furthermore, the present invention may also be implemented as a computer-readable recording medium on which the program is recorded, such as a CD-ROM. Furthermore, the present invention may also be implemented as information, data, or a signal, which represents the program. In addition, such program, information, data and signal may be distributed via a communication network such as the Internet.

Furthermore, a portion or all of the constituent elements of the image coding apparatus may be structured as a single system LSI. The system LSI is a super multi-functional LSI manufactured by integrating a plurality of structural units onto a single chip. Specifically, it is a computer system including a microprocessor, a ROM, a RAM, and the like.

INDUSTRIAL APPLICABILITY

The image coding apparatus and image coding method in the present invention are useful in a digital television or recorder or the like which performs coding in the H.264 standard and performs broadcasting and recording.

What is claimed is:

1. An image coding apparatus which codes an input image on a block basis, the image coding apparatus comprising:
   a coding condition determining unit configured to determine a coding condition for each block;
   a predictive coding unit configured to generate transformed data by generating a predictive image based on the coding condition determined by the coding condition determining unit and performing orthogonal transform on a difference between the predictive image generated and the input image;
   a local decoding unit configured to generate a reconstructed image by performing inverse-transform on the transformed data generated by the predictive coding unit and adding-up the inverse-transformed data and the predictive image;
   a storage unit configured to store the reconstructed images generated by the local decoding unit;
   an entropy coding unit configured to generate coded data by performing entropy coding on the transformed data generated by the predictive coding unit;

a switching unit configured to select one of the coded data generated by the entropy coding unit and uncompressed image data corresponding to the coded data, and to output the selected one of the coded data and the uncompressed image data;

a judging unit configured to judge whether or not a code amount of the coded data generated by the entropy coding unit is larger than a threshold that is determined in advance; and a control unit configured to change a coding type of a first block and a coding type of a second block to a specified coding type that is determined in advance, when the judging unit judges that a code amount of coded data generated by coding the first block is larger than the threshold, the first block being one of the blocks making up the input image, and the second block being at least one of the blocks that are not yet coded, wherein the switching unit is configured to output the uncompressed image data corresponding to the coded data when the coding type of the coded data is the specified coding type, the predictive coding unit and the entropy coding unit are configured to perform pipeline processing having n-stages (where n is an integer equal to or greater than 2), and when the judging unit judges that the code amount of the coded data is larger than the threshold, the control unit is configured to change, to I_PCM, the coding type of only the second blocks up to an appearance of a block having a coding type that is one of skip, direct, and inter among the blocks that are not yet coded.

2. An image coding apparatus which codes an input image on a block basis, the image coding apparatus comprising:

a coding condition determining unit configured to determine a coding condition for each block;

a predictive coding unit configured to generate transformed data by generating a predictive image based on the coding condition determined by the coding condition determining unit and performing orthogonal transform on a difference between the predictive image generated and the input image;

a local decoding unit configured to generate a reconstructed image by performing inverse-transform on the transformed data generated by the predictive coding unit and adding-up the inverse-transformed data and the predictive image;

a storage unit configured to store the reconstructed images generated by the local decoding unit;

an entropy coding unit configured to generate coded data by performing entropy coding on the transformed data generated by the predictive coding unit;

a switching unit configured to select one of the coded data generated by the entropy coding unit and uncompressed image data corresponding to the coded data, and to output the selected one of the coded data and the uncompressed image data;

a judging unit configured to judge whether or not a code amount of the coded data generated by the entropy coding unit is larger than a threshold that is determined in advance; and a control unit configured to change a coding type of a first block and a coding type of a second block to a specified coding type that is determined in advance, when the judging unit judges that a code amount of coded data generated by coding the first block is larger than the threshold, the first block being one of the blocks making up the input image, and the second block being at least one of the blocks that are not yet coded, wherein the switching unit is configured to output the uncompressed image data corresponding to the coded data when the coding type of the coded data is the specified coding type, the predictive coding unit and the entropy coding unit are configured to perform pipeline processing having n-stages (where n is an integer equal to or greater than 2), and the control unit is configured to change, to the specified coding type, only the coding type of the first block out of the first block and the second block, when the first block and the second block are not spatially adjacent to each other.

3. An image coding method for coding an input image on a block basis, the image coding method comprising:

determining a coding condition for each block;

generating transformed data by (i) generating a predictive image based on the coding condition determined in the determining of a coding condition and (ii) performing orthogonal transform on a difference between the predictive image generated and the input image;

generating a reconstructed image by (i) performing inverse-transform on the transformed data generated in the generating of transformed data and (ii) adding-up the inverse-transformed data and the predictive image;

storing the reconstructed images generated in the generating of a reconstructed image;

generating coded data by performing entropy coding on the transformed data generated in the generating of transformed data;

selecting one of the coded data generated in the generating of coded data and uncompressed image data corresponding to the coded data, and outputting the selected one of the coded data and the uncompressed image data;

judging whether or not a code amount of the coded data generated in the generating of coded data is larger than a threshold that is determined in advance; and changing a coding type of a first block and a coding type of a second block to a specified coding type that is determined in advance, when it is judged in the judging that a code amount of coded data generated by coding the first block is larger than the threshold, the first block being one of the blocks making up the input image, and the second block being at least one of the blocks that are not yet coded, wherein in the selecting, the uncompressed image data corresponding to the coded data is outputted when the coding type of the coded data is the specified coding type, in the generating of transformed data and the generating of coded data, pipeline processing having n-stages (where n is an integer equal to or greater than 2) is performed, and in the changing of a coding type, when it is judged in the judging that the code amount of the coded data is larger than the threshold, the coding type of only the second blocks up to an appearance of a block having a coding type that is one of skip, direct, and inter among the blocks that are not yet coded is changed to I_PCM.

4. An image coding method for coding an input image on a block basis, the image coding method comprising:

determining a coding condition for each block;

generating transformed data by (i) generating a predictive image based on the coding condition determined in the determining of a coding condition and (ii) performing orthogonal transform on a difference between the predictive image generated and the input image;

generating a reconstructed image by (i) performing inverse-transform on the transformed data generated in the generating of transformed data and (ii) adding-up the inverse-transformed data and the predictive image;

storing the reconstructed images generated in the generating of a reconstructed image;

generating coded data by performing entropy coding on the transformed data generated in the generating of transformed data;

selecting one of the coded data generated in the generating of coded data and uncompressed image data corresponding to the coded data, and outputting the selected one of the coded data and the uncompressed image data;

judging whether or not a code amount of the coded data generated in the generating of coded data is larger than a threshold that is determined in advance; and changing a coding type of a first block and a coding type of a second block to a specified coding type that is determined in advance, when it is judged in the judging that a code amount of coded data generated by coding the first block is larger than the threshold, the first block being one of the blocks making up the input image, and the second block being at least one of the blocks that are not yet coded, wherein in the selecting, the uncompressed image data corresponding to the coded data is outputted when the coding type of the coded data is the specified coding type, in the generating of transformed data and the generating of coded data, pipeline processing having n-stages (where n is an integer equal to or greater than 2) is performed, and in the changing of a coding type, when the first block and the second block are not spatially adjacent to each other, only the coding type of the first block out of the first block and the second block is changed to the specified coding type.

* * * * *